(12) United States Patent
Willms et al.

(10) Patent No.: US 7,312,702 B1
(45) Date of Patent: Dec. 25, 2007

(54) EXPEDITING RELEASE PROCEDURE OF CARGO CONTAINER AT BORDER CROSSING OR AT CUSTOMS ENTRY POINT BY TRACKING AND REPORTING THREATS WHILE CARGO CONTAINER IS IN TRANSIT

(75) Inventors: Paul H Willms, Everett, WA (US); Jesse David Rothkopf, Bellevue, WA (US)

(73) Assignee: Erudite Holding LLC, Everett, WA (US)

( * ) Notice: Subject to any disclaimer, the term of this patent is extended or adjusted under 35 U.S.C. 154(b) by 293 days.

(21) Appl. No.: 11/063,436

(22) Filed: Feb. 22, 2005

(51) Int. Cl.
G08B 21/00 (2006.01)

(52) U.S. Cl. .......................... 340/540; 340/545.6; 705/1

(58) Field of Classification Search ................ 340/540, 340/5.81, 545.6, 539.13, 572.1–572.9; 705/1
See application file for complete search history.

(56) References Cited

U.S. PATENT DOCUMENTS

| | | | |
|---|---|---|---|
| 6,252,544 B1 | 6/2001 | Hoffberg | 342/357.1 |
| 7,002,472 B2 * | 2/2006 | Stratmoen et al. | 340/539.26 |
| 2005/0099292 A1 * | 5/2005 | Sajkowsky | 340/539.13 |
| 2005/0197844 A1 * | 9/2005 | Ng et al. | 705/1 |
| 2006/0033616 A1 * | 2/2006 | Silva et al. | 340/539.22 |

* cited by examiner

Primary Examiner—Phung T. Nguyen
(74) Attorney, Agent, or Firm—Boris G. Tankhilevich

(57) ABSTRACT

A method of expediting a release procedure of at least one cargo container at least one border crossing or at least one customs entry point by detecting each statistically significant threat (SST) signal associated with at least one said cargo container while in transit, and by tracking and reporting to an appropriate party the position coordinates and a security status of each cargo container that generated at least one said SST signal. The appropriate party is selected from the group consisting of: {Homeland Security agency; and a cargo security agency}. The cargo security agency is further selected from the group consisting of: {a consignee; a steamship line; a customs broker; a freight forwarder; and a terminal operator}.

18 Claims, 9 Drawing Sheets

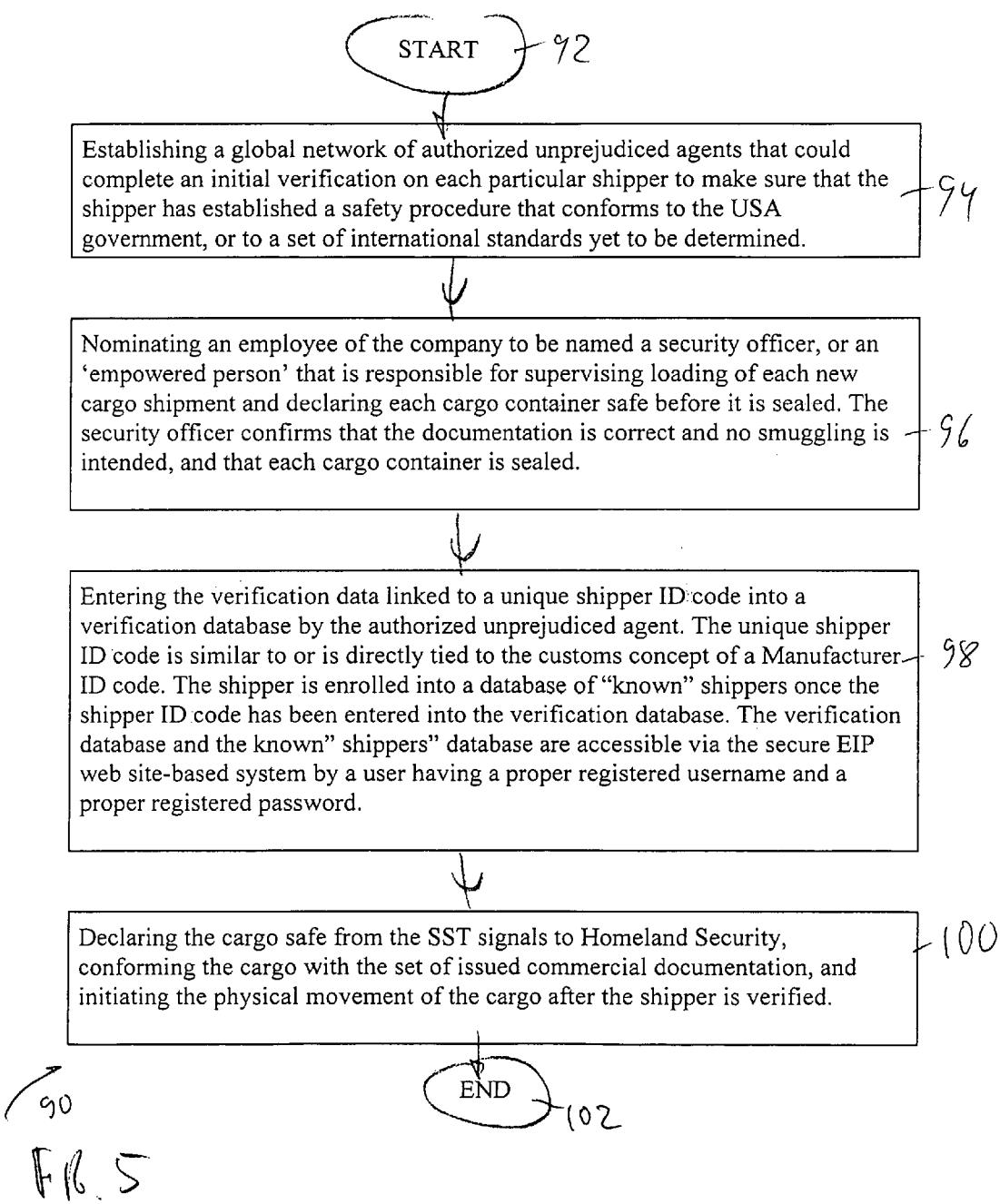

```
                    ┌─────────┐
                    │  Start  │─112
                    └────┬────┘
                         ▼
```

| Obtaining an account by a party who is responsible for payment and coordination of the cargo shipment with a website/portal provider of the secure EIP web site-based system and or/ obtaining an account by the party who is responsible for payment and coordination of the cargo shipment directly with customs at the country of destinationhe party who is responsible for payment and coordination of the cargo shipment is selected from the group consisting of: {a consignee; a shipper; or a third party that is responsible for the payment and coordination of the cargo shipment}. | 114 |

| Logging in into the obtained account by the party who is responsible for payment and coordination of the cargo shipment to generate a new cargo shipment that is identified by a unique cargo shipment number. | 116 |

| Generating a purchase order by the party who is responsible for payment and coordination of the cargo shipment. | 118 |

| Generating a commercial invoice by the shipper. | 120 |

| Generating a manifest transmission & Bill of Lading (B/L) info by the carrier and/or a freight forwarder. | 122 |

| Performing review of Entry Data by the customs broker and/or an importer of record and the party who is responsible for payment and coordination of the cargo shipment to correct any possible errors or to make clarifications before transmission. | 124 |

| Generating a signal to trigger transmission of customs entry by the website/portal when a cargo container is within a predetermined duration of time away from arrival at a physical border. | 126 |

| Disseminating the customs release data to appropriate parties by customs via the website/portal. | 128 |

| Disseminating the cargo release data by the carrier and or the freight forwarders to each appropriate parties via the website/portal | 130 |

| Reverting to the standard methods of submission of customs entry and documents (via traditional ABI transmission or by submitting hard copies of actual documents) to customs in the event that any such data is missing, or rejected, or if customs or other governmental agency is to more closely review the shipping and commercial documents; wherein the standard methods of submission of customs entry and documents include using a standard customs rejection procedure and filing of a correction procedure if any such data is missing or rejected. | 132 |

```
                    ┌─────────┐
                    │   END   │─134
                    └─────────┘
```

```
┌─────────────────────────────────────────────────────────────────┐
│ Using the PIN# to generate the purchase order based on a set of data selected
│ from the group consisting of: {a supplier contact info; a consignee contact info;
│ a number of pieces being purchased; a purchase price per item; a currency of      │─ 144
│ transaction; customs harmonized Codes for each item being purchased and/or
│ shipped; Commercial Bill of Lading (B/L) Description of goods; *Purchaser's
│ sku #s of the goods*; date of purchase order; INCO Terms; a desired mode of
│ transport; a desired carrier; related parties (yes/no); *an Importer's account
│ number including Federal Tax ID#; binding ruling number; an ach payment
│ type; OGA filing codes; and final delivery address and contact info*}.
└─────────────────────────────────────────────────────────────────┘
```

Using the PIN# to control access to the new cargo shipment and to grant access to the new cargo shipment to a set of appropriate parties selected from the group consisting of: {at least one shipper; at least one custom broker; at least one forwarder; and at least one carrier}. — 146

Using the PIN# to update a set of account data selected from the group consisting of: {an update to delivery address; an update to customs entry; an update in value; and other relevant updates that may occur while the cargo shipment is enroute}. — 148

Establishing an audit trail with each such update of the account data to specifically identify a party which is responsible for the relevant updates, or to specifically identify a party which authorized the relevant updates. — 150

140

END — 152

FIG. 7

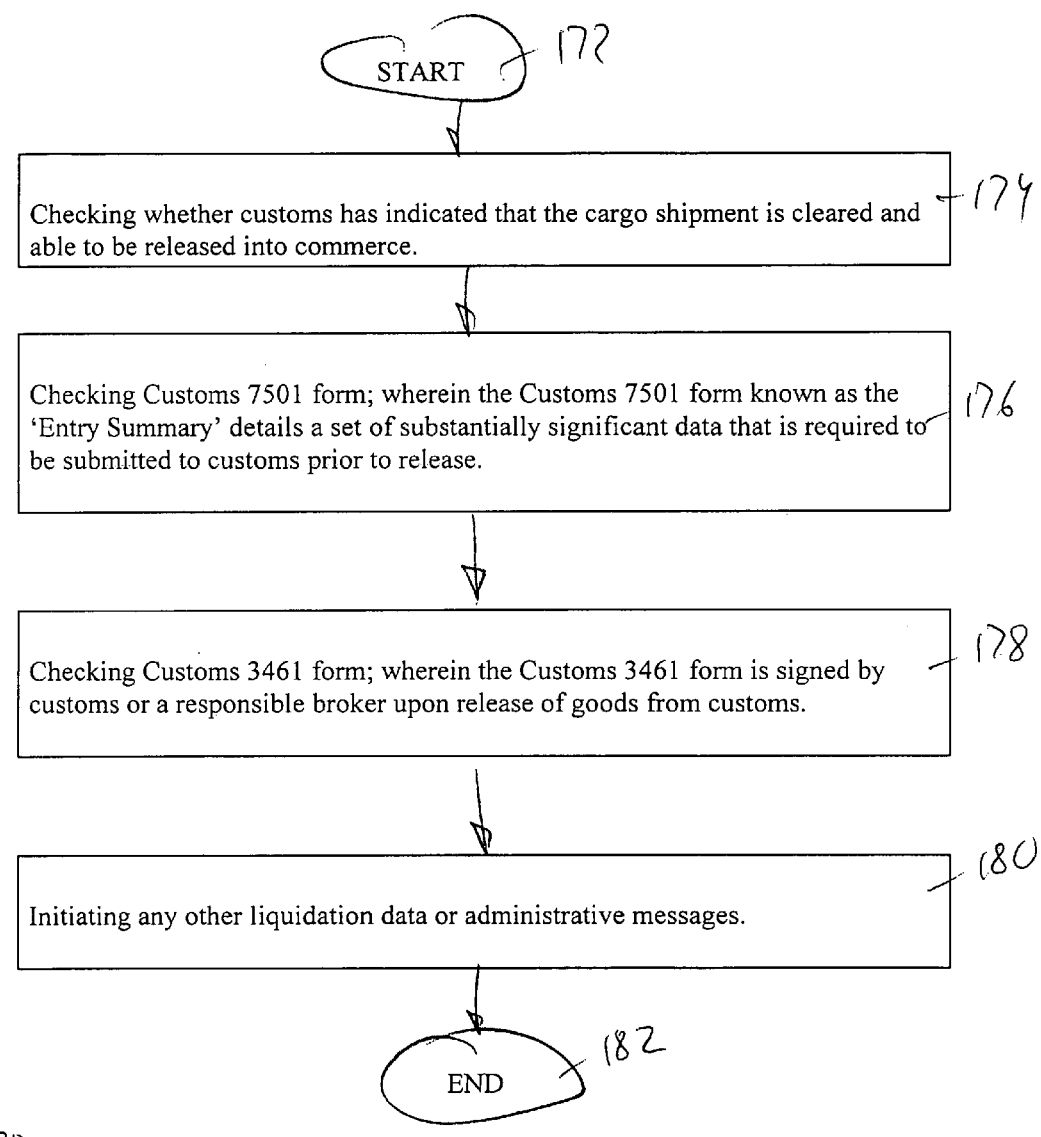

EXPEDITING RELEASE PROCEDURE OF CARGO CONTAINER AT BORDER CROSSING OR AT CUSTOMS ENTRY POINT BY TRACKING AND REPORTING THREATS WHILE CARGO CONTAINER IS IN TRANSIT

BACKGROUND OF THE INVENTION

1. Field of the Invention

The current invention relates to Homeland Security, and, more specifically, to expediting release procedure of cargo containers at border crossing or at customs entry point by tracking and reporting threats while cargo containers are in transit.

2. Discussion of the Prior Art

Here are some facts that were disclosed in the written testimony before a hearing of the Subcommittee on Oversight and Investigations, Committee on Energy and Commerce, at the United States House of Representatives, during discussions on "The Limitations of the Current Cargo Container Targeting", on "A Review to Assess Progress with the Bureau of Customs and Border", and on "Protection's Targeting Program for Sea Cargo" by Stephen E. Flynn, Ph.D. Commander, U.S. Coast Guard (ret.), Jeane J. Kirkpatrick, Senior Fellow in National Security Studies, on Mar. 31, 2004.

The USA is spending more on conventional military power than the next thirty nations combined. By 2008, the USA will be spending more than the rest of the world combined. America's military supremacy means that the only way the current and future adversaries can attack the U.S. is to use an asymmetrical approach, like the 9/11 attack on American soil. This is because such asymmetrical attacks could generate a widespread economic and societal disruption which weakens the foundation upon America's military supremacy ultimately rests.

There are many possible scenarios of how the United States could be targeted by terrorist groups. The intermodal transportation system that is the backbone of the global supply chains that support the U.S. manufacturing and retailing sectors could be a primary target. The current intermodal transportation system makes it possible to move up to 65,000 pounds of goods in one box from anywhere on the planet to the United States for a few thousand dollars. It has proven to be a boon for organized crime. Based on arrest and seizure records, it is known that criminals have been smuggling human beings, small-arms, multi-ton cargo shipments of narcotics, knock-off products, and every other form of contraband in containers. For example, cargo thieves stole an estimated $15 billion of goods in 2000—up from about $1 billion of cargo theft a decade before.

The same system that has proven to be so vulnerable to criminal activity, is clearly susceptible to being targeted by terrorists. For example, according to the Jerusalem Post, the Palestinian terrorists responsible for the suicide bombings at the Port of Ashdod which killed ten Israelis may have been smuggled from Gaza in a container outfitted with a secret compartment and an arms cache. If this turns out to be the case, the risk that containers can be used as a weapons delivery device is no longer a hypothetical threat.

However, the terrorist risk associated with containers goes beyond their being a conduit for suicide bombers. A much more disturbing possibility is that a container could be used to transmit a weapon of mass destruction. There is no doubt that should a nuclear weapon be smuggled into the United States and activated, it would have devastating consequences in terms of loss of life and destruction of property within the blast zone. But unlike a weapon delivered by a missile, an attack carried out with a container would likely lead to the shutdown of all U.S. ports. Should the U.S. ports be locked down for a period of three weeks—which is not inconceivable should a terrorist group like al Qaeda carry out a simultaneous attack using containers arriving in different ports—the entire global trade system would go into gridlock. Since the transportation system has become the warehouses for just-in-time retailers and manufactures, the U.S. store shelves would quickly go bare and the U.S. factories would be idled.

If the current transportation system is not significantly improved, the probability of detection of a weapon from an untrusted shipper being 9.75 percent rises to only a maximum of 24 percent if the cargo shipment comes from a certified shipper. However, if the weapon is placed in a 20-foot container which are commonly used to move heavy machinery, the probability of detection drops to nearly zero because the radiography cannot penetrate cargo that would likely be between the wall of the container and the weapon.

SUMMARY OF THE INVENTION

The present invention addresses these problems by providing an expediting release procedure of a cargo container at border crossing or at customs entry point by tracking and reporting threats while the cargo container is in transit.

One aspect of the present net invention is directed to a method of expediting a release procedure of at least one cargo container at least one border crossing or at least one customs entry point by detecting each statistically significant threat (SST) signal associated with at least one cargo container while in transit, and by tracking and reporting to each appropriate party the position coordinates and a security status of each cargo container that generated at least one SST signal.

In one embodiment of the present invention, the appropriate party is selected from the group consisting of: {Homeland Security agency; and a cargo security agency}. In this embodiment of the present invention, the cargo security agency is further selected from the group consisting of: {a consignee; a steamship line; a customs broker; a freight forwarder; and a terminal operator}.

In one embodiment, the method of the present invention comprises the following steps: (A) detecting at least one SST signal associated with at least one cargo container while in transit; wherein each SST signal generates a threat signal having a threat probability higher than a predetermined threshold; (B) if at least one SST signal associated with at least one cargo container while in transit was detected, identifying each cargo container that generated at least one SST signal and classifying the security status of each cargo container as a Potential Threat (PT) cargo container; wherein each cargo container that was not classified as the PT cargo container is classified as having a security status of an Expedited Release Procedure (ERP) cargo container; (C) tracking and reporting position coordinates and the security status of each PT cargo container to each appropriate party; (D) tracking and reporting position coordinates and the security status of each ERP cargo container to each appropriate party; and (E) expediting the release procedure at least one border crossing or at least one customs entry point of each ERP cargo container.

In one embodiment of the present invention, the step (A) detecting at least one SST signal associated with at least one cargo container while in transit further comprises the following steps: (A1) using at least one threat detector to detect at least one SST signal associated with at least one cargo container while in transit; and (A2) using at least one detected SST signal to activate at least one RFID tag attached to at least one cargo container associated with at least one detected SST signal. In one embodiment of the present invention, each RFID tag is selected from the group consisting of: {an active RFID tag; and a passive RFID tag}. In one embodiment of the present invention, each threat detector is selected from the group consisting of: {an active threat detector; and a passive threat detector}.

In one embodiment of the present invention, the step (B) of identifying each cargo container that generated at least one SST signal and classifying the security status of each cargo container as the Potential Threat (PT) cargo container further comprises the step (B1) of using at least one activated RFID tag to locate at least one PT container.

In one embodiment of the present invention, the step (C) of tracking and reporting position coordinates and security status of each PT cargo container to the appropriate party further comprises the step (C1) of using a radio navigational equipment to substantially continuously determine and track position coordinates of each PT container. In one embodiment of the present invention, the radio navigational equipment is selected from the group consisting of: {a GPS navigational processor; a GLONASS navigational processor; a combined GPS/GLONASS navigational processor; a GALILEO navigational processor; a Global Navigational Satellite System (GNSS) navigational processor; and a pseudolite navigational processor}.

In one embodiment of the present invention, the step (C) of tracking and reporting position coordinates and security status of each PT cargo container to each appropriate party further comprises the step (C2) of generating an alarm signal when at least one container was identified as a PT container while in transit.

In one embodiment of the present invention, the step (C) of tracking and reporting position coordinates and security status of each PT cargo container to each appropriate party further comprises the following steps: (C3) checking at least one generated SST signal to verify the security status of at least one PT container while in transit; and (C4) if at least one SST signal is confirmed to be a false positive SST signal, changing the security status of at least one PT container associated with the false positive SST signal to an indefinite security status (ISS) cargo container.

In one embodiment of the present invention, the step (C) of tracking and reporting position coordinates and security status of each PT cargo container to each appropriate party further comprises the step (C5) of substantially continuously updating and reporting an electronic identity of each PT container. In one embodiment of the present invention, the electronic identity of a PT container comprises a plurality of parameters selected from the group consisting of: {a security status of the PT container; an alarm event associated with the PT container; an electronic transmission to each appropriate party of an alarm event associated with the PT container; and a change in security status of the PT container due to a false positive SST signal to an indefinite security status (ISS)}.

In one embodiment of the present invention, the step (C) of tracking and reporting position coordinates and security status of a PT cargo container to each appropriate party further comprises the step (C6) of reporting the position coordinates of the PT container by using a reporting means selected from the group consisting of: {a cellular phone; a radio; a TV transmitter; a satellite phone; a cable; and a website/portal}.

In one embodiment of the present invention, the step (D) of tracking and reporting position coordinates and the security status of an ERP cargo container to each appropriate party further comprises the step (D1) of using a radio navigational equipment to substantially continuously determine and track position coordinates of each ERP container. In one embodiment of the present invention, the radio navigational equipment is selected from the group consisting of: {a GPS navigational processor; a GLONASS navigational processor; a combined GPS/GLONASS navigational processor; a GALILEO navigational processor; a Global Navigational Satellite System (GNSS) navigational processor; and a pseudolite navigational processor}.

In one embodiment of the present invention, the step (D) of tracking and reporting position coordinates and security status of an ERP cargo container to each appropriate party further comprises the following steps: (D2) of substantially continuously checking the security status of each ERP container while in transit by using at least one threat detector to detect a previously undetected (PU) SST signal; and (D3) if at least one ERP container generates the previously undetected (PU) SST signal, changing the security status of at least one ERP container associated with the PUSST signal to an indefinite security status (ISS) cargo container.

In one embodiment of the present invention, the step (D3) of changing the security status of at least one ERP container associated with the previously undetected SST signal to a PT cargo container further comprises the following steps: (D3, 1) activating at least one RFID tag associated with the PUSST signal to indicate the change in the classification of at least one cargo container from the ERP security status to the ISS security status; and (D3, 2) generating an alarm signal when at least one ERP container changes its security status from the ERP security status to the ISS security status.

In one embodiment of the present invention, the step (D) of tracking and reporting position coordinates and security status of an ERP cargo container to each appropriate party further comprises the step (D4) of substantially continuously updating and reporting an electronic identity of the ERP container. In one embodiment of the present invention, the electronic identity of an ERP container comprises a plurality of parameters selected from the group consisting of: {a security status of the ERP container; a change in security status of the ERP container due to a PUSST signal; an alarm event associated with the PUSST signal; and an electronic transmission to each appropriate party of the alarm event associated with the PUSST signal}.

In one embodiment of the present invention, the step (D) of tracking and reporting position coordinates and security status of an ERP cargo container to each appropriate party further comprises the step (D5) of reporting the position coordinates of each ERP container by using a reporting means selected from the group consisting of: {a cellular phone; a radio; a TV transmitter; a satellite phone; a cable; and a website/portal}.

In one embodiment of the present invention, the step (E) of expediting the release procedure at least one border crossing or at least one customs entry point of an ERP cargo container further comprises the following step: (E1) making a determination of whether a cargo shipment including a plurality N of cargo containers should be immediately released into commerce, or if the cargo shipment including the plurality N of cargo containers should be inspected before the cargo shipment is released into commerce, wherein N is an integer.

In one embodiment of the present invention, the step (E1) of making the determination of whether a cargo shipment including the plurality N of cargo containers should be immediately released into commerce, or if the cargo shipment including the plurality N of cargo containers should be inspected before the cargo shipment is released into commerce, further comprises the following steps: (E1, 1) compiling a set of security data including a security status for each container while in transit; (E1, 2) analyzing the set of security data compiled in the step (E1, 1); (E1, 3) if the set of security data indicates an ERP status for each container in the cargo shipment, making a determination of whether the cargo shipment including the plurality N of the ERP cargo containers should be immediately released into commerce; and (E1, 4) if the set of security data indicates a change from ERP status to PT status for an integer K number of the ERP containers, making a determination of whether the cargo shipment including a plurality (N-K) of the ERP cargo containers and a plurality K of containers with indefinite security status (ISS) should be inspected before the cargo shipment is released into commerce.

In one embodiment of the present invention, the step (E1, 4) of making the determination of whether the cargo shipment including the plurality (N-K) of ERP cargo containers and the plurality K of ISS containers should be inspected before the cargo shipment is released into commerce, further comprises the following steps: (E1, 4, 1) setting a set of threshold numbers; and (E1, 4, 2) determining a number of containers $N_{inspected}$ to be inspected depending on the relationship between K number of ISS containers and each threshold number.

In one embodiment of the present invention, the step (E1, 4) of making the determination of whether the cargo shipment including the plurality (N-K) of the ERP cargo containers and the plurality K of ISS containers should be inspected before the cargo shipment is released into commerce, further comprises the following steps: (E1, 4, 3) setting a set of threshold numbers $\{N_{threshold1}; N_{threshold2}; N_{threshold3}; \ldots N_{threshold(L-1)}; N_{thresholdL}\}$; L being an integer; and (E1, 4, 4) determining a number of containers $N_{inspected}$ to be inspected depending on the relationship between K number of ISS containers and each threshold number.

In one embodiment of the present invention, $N_{inspected}$ is equal to zero if K number is less than or equal to the first threshold number $N_{threshold1}$; $N_{inspected}$ is equal to the first threshold number $N_{threshold1}$ if K number is less than or equal to the second threshold number $N_{threshold2}$; $N_{inspected}$ is equal to the second threshold number $N_{threshold2}$ if K number is less than or equal to the third threshold number $N_{threshold3}$; and $N_{inspected}$ is equal to the (L-1) threshold number $N_{threshold(L-1)}$ if K number is less than or equal to the last threshold number $N_{thresholdL}$.

In one embodiment of the present invention, the step (E) of expediting the release procedure at least one border crossing or at least one customs entry point of each ERP cargo container further comprises the step (E2) of using a secure ERP website-base system to expedite the release procedure at least one border crossing or at least one customs entry point of each ERP cargo container.

In one embodiment of the present invention, the secure ERP website-based system is configured to collect and to process a set of combined data selected from the group consisting of: {a set of normal commercial transaction data; a set of transport data; a set of RFID data; a set of satellite navigational tracking data; a set of threat signal data; and a set of security status data}; wherein the set of combined data is a collection of inputs from a supply chain selected from the group consisting of: {each such container entering at least one border crossing or at least one customs entry point; the customs at least one destination country; a network of shippers; a network of consignees; a network of forwarders; a plurality of terminals; and a network of carriers}.

In one embodiment of the present invention, the step (E2) of using the secure ERP web-site based system to expedite the release procedure at least one border crossing or at least one customs entry point of each ERP cargo container further comprises the following steps: (E2, 1) utilizing the set of data selected from the group consisting of: {the RFID data; the set of satellite navigational tracking data; and the set of threat signal data} to indicate a physical location of at least one ISS cargo container that will be submitted for customs clearance within a predetermined distance and time of arrival from a port of discharge and/or port of entry; and (E2, 2) using the secure ERP website-based system configured to enable the preparation and population of a set of ERP data documentation for the expedite release procedure for each ERP cargo container including a set of data selected from the group consisting of: {a set of commercial invoices; a set of packing lists; a set of manifests; a set of Bills of Lading; a set of commercial documents including a certificate of origin, manufacturer safety data sheets, pre-shipment cargo inspection reports, documentary collections, quota certificates, solid wood packing declarations; and a set of customs entry data}.

In this embodiment of the present invention, on one hand, the current location of each ISS cargo container that generated at least one previously undetected SST (PUSST) signal is posted on the secure ERP website. In this embodiment of the present invention, a predetermined number of the ISS cargo containers in the cargo shipment should be physically inspected at least one border crossing or at least one customs entry point or at port of customs entry. On the other hand, in this embodiment of the present invention, each ERP cargo container is immediately released into the stream of commerce without being physically inspected at the border crossing or at least one customs entry point.

In one embodiment of the present invention, the step (E2, 2) of using the secure ERP website-based system configured to enable the preparation and population of the set of ERP data documentation for the expedite release procedure for each ERP cargo container further comprises the following steps: (E2, 2, 1) securing a set of ERP-enabling data collected on a website/portal of the secure ERP website-based system; (E2, 2, 2) disseminating the set of ERP-enabling data to each appropriate party; and (E2, 2, 3) establishing a shipper verification system that provides a positive assurance that a new cargo shipment is secure throughout the entire supply chain.

In this embodiment of the present invention, the ERP-enabling data is selected from the group consisting of: {a consignee data including a customs broker data; a shipper data; a carrier data including a port/terminal data from the port of departure; and a customs/Automated Brokerage Interface (ABI)/Other Governmental Agency (OGA) data}, whereas the ERP-enabling data comes from each appropriate party located anywhere in the world. In this embodiment of the present invention, an appropriate party is selected from the group consisting of: {the consignee; a customs broker; the shipper; the carrier; the port and terminal operator; the customs; a designated agent of the consignee; a designated agent of the customs broker; a designated agent of the shipper; a designated agent of the carrier; a designated agent of the port and terminal operator; and a designated agent of the customs}.

In one embodiment of the present invention, the step (E2, 2, 3) of establishing the shipper verification system further comprises the following steps: (E2, 2, 3, 1) establishing a global network of authorized unprejudiced agents that could complete an initial verification on each particular shipper to make sure that the shipper has established a safety procedure that conforms to the USA government, or to a set of international standards yet to be determined; (E2, 2, 3, 2) nominating an employee of the company to be named a security officer, or an 'empowered person' that is responsible for supervising loading of each new cargo shipment and declaring each cargo container safe before it is sealed; wherein the security officer confirms that the documentation is correct and no smuggling is intended; and wherein the security officer confirms that each cargo container is sealed; (E2, 2, 3, 3) entering the verification data linked to a unique shipper ID code into a verification database by the authorized unprejudiced agent; wherein the unique shipper ID code is similar to or is directly tied to the customs concept of a Manufacturer ID code; and wherein the shipper is enrolled into a database of "known" shippers once the shipper ID code has been entered into the verification database; and wherein the verification database and the known "shippers" database are accessible via the secure ERP website-based system by a user having a proper registered username and a proper registered password; and (E2, 2, 3, 4) declaring the cargo safe from the SST signals to Homeland Security, conforming the cargo with the set of issued commercial documentation, and initiating the physical movement of the cargo after the shipper is verified.

In one embodiment of the present invention, the step (E2, 2) of using the secure ERP website-based system configured to enable the preparation and population of the set of ERP data documentation for customs entry transmission for each ERP cargo container further comprises the following steps: (E2, 2, 4) obtaining an account by a party who is responsible for payment and coordination of the cargo shipment with a website/portal provider of the secure ERP website-based system and or/obtaining an account by the party who is responsible for payment and coordination of the cargo shipment directly with customs at the country of destination, wherein the party who is responsible for payment and coordination of the cargo shipment is selected from the group consisting of: {a consignee; a shipper; or a third party that is responsible for the payment and coordination of the cargo shipment}; (E2, 2, 5) logging in into the obtained account by the party who is responsible for payment and coordination of the cargo shipment to generate a new cargo shipment that is identified by a unique cargo shipment number; (E2, 2, 6) generating a purchase order by the party who is responsible for payment and coordination of the cargo shipment; (E2, 2, 7) generating a commercial invoice by the shipper; (E2, 2, 8) generating a manifest transmission & Bill of Lading (B/L) info by the carrier and/or a freight forwarder; (E2, 2, 9) performing review of Entry Data by the customs broker and/or an importer of record and the party who is responsible for payment and coordination of the cargo shipment to correct any possible errors or to make clarifications before transmission; (E2, 2, 10) generating a signal to trigger transmission of customs entry by the website/portal when a cargo container is within a predetermined length of time away from arrival at a physical border; (E2, 2, 11) disseminating the customs release data to appropriate parties by customs via the website/portal; (E2, 2, 12) disseminating the cargo release data by the carrier and or the freight forwarders to appropriate parties via the website/portal; and (E2, 2, 13) reverting to the standard methods of submission of customs entry and documents (via traditional ABI transmission or by submitting hard copies of actual documents) to customs in the event that any such data is missing, or rejected, or if customs or other governmental agency is to more closely review the shipping and commercial documents; wherein the standard methods of submission of customs entry and documents include using a standard customs rejection procedure and filing of a correction procedure if any such data is missing or rejected.

In one embodiment of the present invention, the step (E2, 2, 5) further comprises the step (E2, 2, 5, 1) of linking an account of the party who is responsible for payment and coordination of the cargo shipment to a set of data selected from the group consisting of: {a predetermined PIN # and/or password; a Federal Tax ID# of the party who is responsible for payment and coordination of the cargo shipment; a Bond type; a surety code; a primary delivery warehouse; a set of delivery locations; a list or database of the Harmonized Tariff numbers for all imported goods for the party who is responsible for payment and coordination of the cargo shipment; and a set of relevant customs binding rulings}.

In one embodiment of the present invention, the step (E2, 2, 6) further comprises the following steps: (E2, 2, 6, 1) using the PIN# to generate the purchase order based on a set of data selected from the group consisting of: {a supplier contact info; a consignee contact info; a number of pieces being purchased; a purchase price per item; a currency of transaction; customs harmonized Codes for each item being purchased and/or shipped; Commercial Bill of Lading (B/L) Description of goods; Purchaser's sku #s of the goods; date of purchase order; INCO Terms; a desired mode of transport; a desired carrier; related parties (yes/no); an Importer's account number including Federal Tax ID#; binding ruling number; an ach payment type; OGA filing codes; and final delivery address and contact info}; (E2, 2, 6, 2) using the PIN# to control access to the new cargo shipment and to grant access to the new cargo shipment to a set of appropriate parties selected from the group consisting of: {at least one shipper; at least one custom broker; at least one forwarder; and at least one carrier}; (E2, 2, 6, 3) using the PIN# to update a set of account data selected from the group consisting of: {an update to delivery address; an update to customs entry; an update in value; and other relevant updates that may occur while the cargo shipment is enroute}; and (E2, 2, 6, 4) establishing an audit trail with each update of the account data to specifically identify a party which is responsible for the relevant updates, or to specifically identify a party which authorized the relevant updates.

In one embodiment of the present invention, the step (E2, 2, 7) further comprises the step (E2, 2, 7, 1) of confirming a set of data selected from the group consisting of: {a supplier contact info; a consignee contact info; a number of pieces being shipped; a sales price per item and a total price; a currency of transaction; a commercial Bill of Lading (B/L) description of goods; seller's sku #s of the goods; a date of invoice; INCO Terms; a mode of transport; a type of packaging units of measure; a SWP declaration; a net weight/gross weight/volume; a number of containers; a type of equipment; a seal number; a vessel; a voyage #; a SCAT code; BL#s; and a country of origin per item}.

In one embodiment of the present invention, the step (E2, 2, 8) further comprises the following steps: (E2, 2, 8, 1) sending a manifest to Customs and Border Protection (CBP) and initiating data for Bill of Lading (B/L) and Arrival Notice by specifying a set of data selected from the group consisting of: {a port of Lading: a port of Unlading; a place of delivery; IT #s and dates; and bonded carrier details}; and (E2, 2, 8, 2) confirming arrival of said cargo shipment at loading pier by a Smart Container lock/Strongbox device.

In one embodiment of the present invention, the step (E2, 2, 10) further comprises the following steps: (E2, 2, 10, 1) confirming that the cargo shipment of containers is nearing a physical border crossing or is nearing customs entry point by using the navigational and the container ID technology; (E2, 2, 10, 2) checking a plurality of alarm events associated with the container cargo shipment; and (E2, 2, 10, 3) compiling a set of customs entry relevant data selected from the group consisting of: {a customs location code at port of entry; a central exam site; values and weight calculations per Customs requirements; freight charges; statistical quantities; manufactures ID Code; units of measure; Duty; MPF; HMF; CVD; a Bond #; and an ACH Payment type}.

In one embodiment of the present invention, the step (E2, 2, 10, 2) of checking the plurality of alarm events associated with the container cargo shipment further comprises the step of increasing the frequency of periodically checking alarm events associated with the SST signals when the cargo ship approaches an arrival port. In another embodiment of the present invention, the step (E2, 2, 10, 2) of checking the plurality of alarm events associated with the container cargo shipment further comprises the step of programming the frequency of periodically checking alarm events associated with the SST signals to take into account nearing approach to a harbor. In one more embodiment of the present invention, the step (E2, 2, 10, 2) of checking the plurality of alarm events associated with the container cargo shipment further comprises the step of unloading of additional testing to be performed as the ship is within the 12 mile international water boundary limit of any country, whether a destination country or not.

In one embodiment of the present invention, the step (E2, 2, 11) further comprises the following steps: (E2, 2, 11, 1) checking whether customs has indicated that the cargo shipment is cleared and able to be released into commerce; (E2, 2, 11, 2) checking Customs 7501 form; wherein the Customs 7501 form known as the 'Entry Summary' details a set of substantially significant data that is required to be submitted to customs prior to release; (E2, 2, 11, 3) checking Customs 3461 form; wherein the Customs 3461 form is signed by customs or a responsible broker upon release of goods from customs; and (E2, 2, 11, 4) initiating any other liquidation data or administrative messages.

In one embodiment of the present invention, the step (E2, 2, 12) further comprises the step (E2, 2, 12, 1) of disseminating the cargo released data in a method similar to the current Automated Manifest System (AMS).

Another aspect of the present invention is directed to a system for expediting a release procedure of at least one cargo container at least one border crossing or at least one customs entry point by detecting each statistically significant threat (SST) signal associated with at least one cargo container while in transit, and by tracking and reporting to each appropriate party the position coordinates and a security status of each cargo container that generated at least one SST signal.

The appropriate party is selected from the group consisting of: {Homeland Security agency; and a cargo security agency}; wherein the cargo security agency is further selected from the group consisting of: {a consignee; a steamship line; a customs broker; a freight forwarder; and a terminal operator}.

In one embodiment of the present invention, the system comprises: (A) a means for detecting at least one SST signal associated with at least one cargo container while in transit; wherein each SST signal generates a threat signal having a threat probability higher than a predetermined threshold; (B) a means for identifying each cargo container that generated at least one SST signal; a means for classifying the security status of a cargo container as a Potential Threat (PT) cargo container; and a means for classifying the security status of a cargo container as an Expedited Release Procedure (ERP) cargo container; C) a means for tracking and a means for reporting position coordinates and the security status of each PT cargo container to each appropriate party; (D) a means for tracking and a means for reporting position coordinates and the security status of each ERP cargo container to each appropriate party; and (E) a means for expediting the release procedure at least one border crossing or at at least one customs entry point of each ERP cargo container.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 5 illustrates a flow chart of establishing the shipper verification system in more details.

FIG. 6 depicts a flow chart that details the usage of the secure ERP website-based system configured to enable the preparation and population of the set of ERP data documentation for customs entry transmission for each ERP cargo container.

FIG. 7 is a flow chart that illustrates the step of generating a purchase order by the party who is responsible for payment and coordination of the cargo shipment in more details.

FIG. 9 depicts a flow chart that details the step of disseminating the customs release data to appropriate parties by customs via the website/portal of the ERP website-based system.

DETAILED DESCRIPTION OF THE PREFERRED AND ALTERNATIVE EMBODIMENTS

Figure 1:
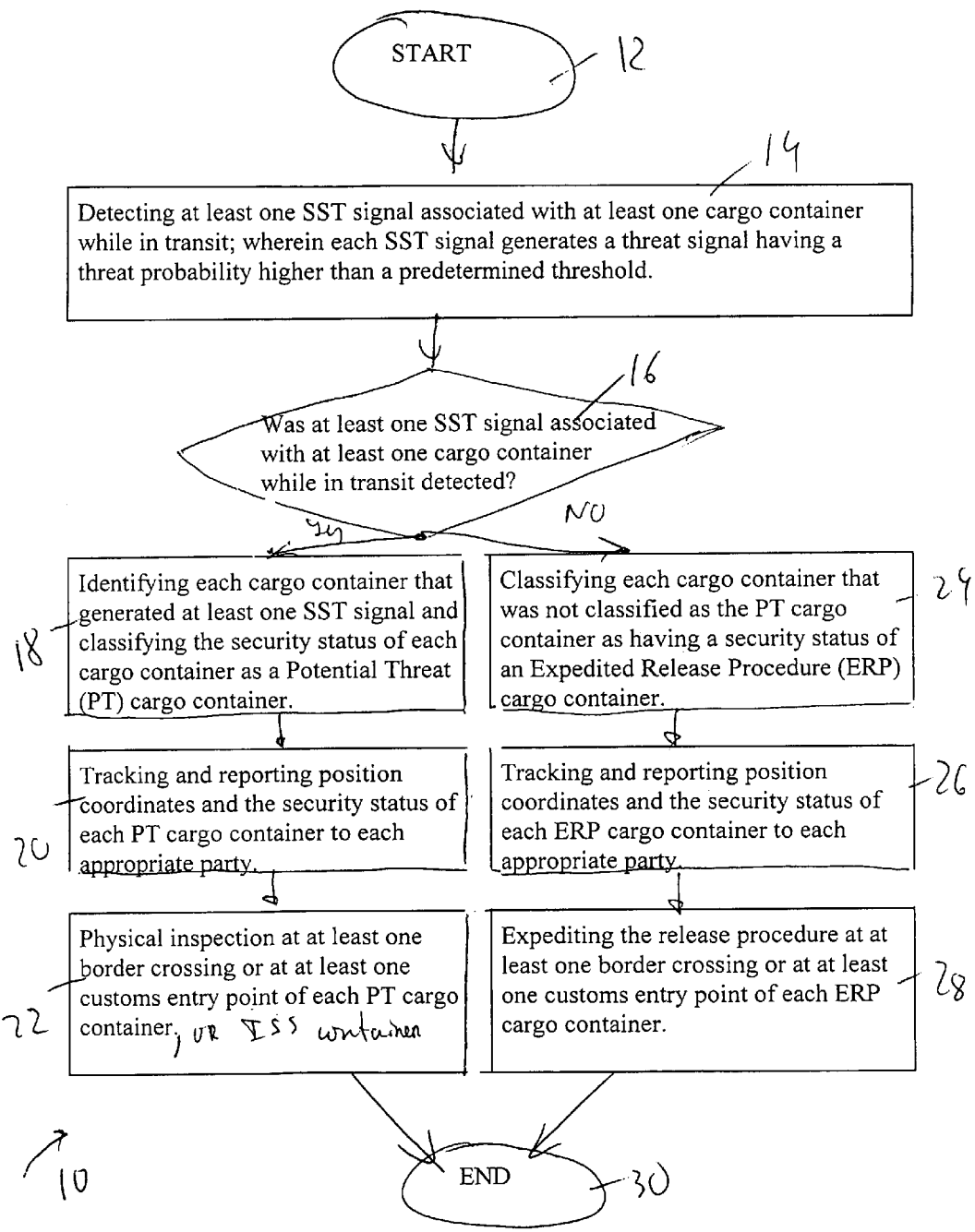
FIG. 1 illustrates the flow chart of the method of the present invention of expediting the release procedure of cargo containers at a border crossing or at a customs entry point by tracking and reporting (SST) signals while cargo containers are in transit.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention addresses the issue of how to expedite a release procedure of cargo containers at border crossings, and/or at customs entry points, and at the same time, to guarantee a high level of Homeland Security from any threat originated from any cargo container that arrives to the USA by sea.

The disclosed in the present invention Web-Based system and method that enables an expedient release procedure of cargo containers at border crossings, and/or at customs entry points, and at the same time, guarantees a high level of Homeland Security from any threat originated from any cargo container that arrives to the USA by sea, is based on the early detection of each statistically significant threat (SST) signal associated with at least one cargo container while in transit, and by tracking and reporting to each appropriate party the position coordinates and a security status of each cargo container that generated at least one SST signal. The SST signal is defined as a threat signal with a substantially high probability of being, indeed, a signal that indicates a real threat to the Homeland security originated from at least one cargo container while in transit.

The U.S. application entitled "DETECTION AND IDENTIFICATION OF THREATS HIDDEN INSIDE CARGO SHIPMENTS" by the inventors Paul Willms and Jim Stanley, Ser. No. 10/931,730, filed on Aug. 31, 2004, and assigned to the assignee of the present patent application, and incorporated herein in its entirety, is hereafter referred to as the patent application #1.

Each such threat considered in the patent application # 1 is assumed to be either hidden inside at least one cargo container before transit, or is assumed to be placed inside at least one cargo container while in transit. Each threat considered in the patent application # 1, while interacting with its surrounding, generates a unique threat signature. The patent application # 1 discloses how to select an array of statistically significant detected threat signatures by measuring a background threat signature distribution in a threat-free environment, by comparing each detected threat signature signal with the background threat signature distribution, and if deviation of the detected threat signature signal from the background threat signature distribution is statistically significant, how to select the array of the statistically significant detected threat signatures for further processing. To determine the likelihood of identifying each threat as a threat to the Homeland Security, the patent application # 1 suggests the following steps: generating a statistically significant threat (SST) signal corresponding to each detected threat signature having the statistically significant deviation from the background threat signature distribution, consulting a database of predetermined thresholds associated with a plurality of known threat signatures, comparing each statistically significant threat (SST) signal with at least one predetermined threshold associated with the plurality of known threats, and selecting each statistically significant threat (SST) signal that exceeds at least one predetermined threshold associated with the plurality of known threats into an N-array of threats, wherein the N-array includes an integer number N of statistically significant threat (SST) signals exceeding at least one predetermined threshold. If the integer number N of statistically significant threat (SST) signals exceeding at least one predetermined threshold and selected into the N-array exceeds a predetermined number $N_{array\_threshold}$, one can determine the likelihood of each threat to generate at least one statistically significant threat (SST) signal. If the likelihood of at least one threat exceeds a predetermined threshold, each threat is identified as a real threat to the Homeland Security.

The U.S. application entitled "ACTIVE THREAT DETECTION AND ELIMINATION WHILE IN TRANSIT" by the inventors Paul Willms and Jim Stanley, Ser. No. 11/025,447, filed on Dec. 27, 2004, and assigned to the assignee of the present patent application, and incorporated herein in its entirety, is hereafter referred to as the patent application #2.

The patent application #2 discloses a method of active detection of at least one threat to the homeland security, each threat is assumed to be either hidden inside at least one cargo container before transit, or is assumed to be placed inside at least one cargo container while in transit, each threat while interacting with its surrounding generates a unique threat signature. The method of the patent application #2 comprises the steps of substantially continuously probing each cargo container to detect at least one threat signature, processing each detected threat signature to identify the statistically significant threat (SST) signals, identifying at least one container that generates such SST signals; and eliminating such threat to the homeland security, if feasible.

Based on the disclosure given in the patent application #1 and in the patent application #2, each statistically significant threat (SST) signal that is discussed in the current patent application, is generated by either using the active probing method of the patent application #2, or by using the passive threat detection devices of the patent application #1.

In one embodiment, FIG. 1 illustrates the flow chart 10 of the method of the present invention of expediting the release procedure of cargo containers at a border crossing or at a customs entry point by tracking and reporting (SST) signals while cargo containers are in transit. The flow chart 10 includes the of detecting at least one SST signal associated with at least one cargo container while in transit (step 14). The test condition 16 bifurcates the flow chart 10.

Indeed, if the test condition 16 is satisfied, that is if at least one SST signal associated with at least one cargo container while in transit was detected, the flow chart 10 has the following steps: (step 18) identifying each cargo container that generated at least one SST signal and classifying the security status of each cargo container as a Potential Threat (PT) cargo container; (step 20) tracking and reporting position coordinates and the security status of each PT cargo container to each appropriate party; and (step 22) performing a physical inspection of each PT cargo container, or some of the indefinite security status (ISS) containers at a border crossing or at a customs entry point. Please, see discussion below.

The appropriate party is selected from the group consisting of: {Homeland Security agency; and a cargo security agency}; wherein the cargo security agency is further selected from the group consisting of: {a consignee; a steamship line; a customs broker; a freight forwarder; and a terminal operator}.

Customs has a variety of inspections on its "menu of options":

(I) Intensive exam: Container is unloaded (partially or fully) and cargo is physically inspected.

(II) Tailgate exam: (usually done by Special Enforcement Teams or by U.S. Dept of Agriculture). The container is opened and government agency 'looks' inside (sometimes uses a canine) for evidence of drugs, stowaways, harmful plants or insects, obvious manifest mis-declarations (ie manifest calls for toys and the container is filled with computers).

(III) VACIS Exam (Vehicle and Cargo Inspection System): customs runs the entire sealed container through an X-ray machine.

(IV) Documents Required exam: Customs and Border Protection (CBP) reviews and inspects the commercial and shipping documents, but generally does not want to do an physical inspection of the cargo.

Referring still to FIG. 1, if, on the other hand, the test condition 16 is not satisfied, that is none of the SST signals associated with at least one cargo container while in transit was detected, the flow chart 10 has the following steps: (step 24) classifying each cargo container that was not classified as a PT cargo container as a cargo container having a security status of an Expedited Release Procedure (ERP) cargo container; (step 26) tracking and reporting position coordinates and the security status of each ERP cargo container to each appropriate party; and (step 28) expediting the release procedure at least one border crossing or at least one customs entry point of each ERP cargo container.

In general, each container is assumed to be equipped with a Smart Container Lock/Strongbox device comprising at least one active threat detector as disclosed in the patent application #2, at least one passive threat detector as disclosed in the patent application #1, a tracking/navigation/ device, a reporting means, a programmable locking device, and a communication means having an access to the Internet (not shown).

In one embodiment of the present invention, the step (14 of flow chart 10 of FIG. 1) of detecting at least one SST signal associated with at least one cargo container while in transit further comprises the following steps (not shown): using at least one threat detector to detect at least one SST signal associated with at least one cargo container while in transit; and using at least one detected SST signal to activate at least one RFID tag attached to at least one cargo container associated with at least one detected SST signal. An activated RFID tag is used to identify and locate a cargo (step 18 of FIG. 1) container that generated the detected SST signal and to classify the security status of each such cargo container as the Potential Threat (PT) cargo container.

In one embodiment of the present invention, the step of tracking and reporting position coordinates and security status of each PT container to the appropriate party (step 20 of FIG. 1) further comprises the step of using a radio navigational equipment (not shown) to substantially continuously determine and track position coordinates of each PT container. Similarly, in one embodiment of the present invention, the step of tracking and reporting position coordinates and the security status of an ERP cargo container to each appropriate party (step 26 of FIG. 1) further comprises the step (not shown) of using a radio navigational equipment to substantially continuously determine and track position coordinates of each ERP container.

In one embodiment of the present invention, the radio navigational equipment is selected from the group consisting of: {a GPS navigational processor; a GLONASS navigational processor; a combined GPS/GLONASS navigational processor; a GALILEO navigational processor; a Global Navigational Satellite System (GNSS) navigational processor; and a pseudolite navigational processor}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (approximately nineteen centimeter carrier wavelength) and an L2 signal having a frequency f2=1227.6 MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudorandom noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1,2,\ldots 24)$ is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system Galileo as a part of a global navigation satellite infrastructure (GNSS).

The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

GALILEO will offer several service levels, from open access to restricted access of various levels:

(A) An open, free basic service, mainly involving applications for the general public and services of general interest. This service is comparable to that provided by civil GPS, which is free of cost for these applications, but with improved quality and reliability.

(B) A commercial service facilitating the development of professional applications and offering enhanced performance compared with the basic service, particularly in terms of service guarantee.

(C) A "vital" service (Safety of Life Service) of a very high quality and integrity for safety-critical applications, such as aviation and shipping. A search and rescue service that will greatly improve existing relief and rescue services.

(D) A public regulated service (PRS), encrypted and resistant to jamming and interference, reserved principally for the public authorities responsible for civil protection, national security and law enforcement which demand a high level of continuity. It will enable secured applications to be developed in the European Union, and could prove in particular to be an important tool in improving the instruments used by the European Union to combat illegal exports and illegal immigration.

The real needs of future GALILEO users need to be identified before the characteristics of the package of services can be decided. Studies have already been carried out in various standardization institutes and international bodies, such as the International Civil Aviation Organization, the International Maritime Organization, etc.

The range of GALILEO services is designed to meet practical objectives and expectations, from improving the coverage of open-access services in urban environments (to cover 95% of urban districts compared with the 50% currently covered by GPS alone) which will benefit the 160 million private vehicles in Europe, or enabling the use of satellite navigation applications "indoors", in buildings and even in tunnels, or indeed mobile telephone services based on identifying the caller's position.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in "Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

Pseudolites as radio positioning systems can be configured to operate in ISM band.

Referring still to FIG. 1, in one embodiment of the present invention, the step of tracking and reporting position coordinates and security status of each PT cargo container to an appropriate party (step 20 of FIG. 1) further comprises the step of generating an alarm signal (not shown) when at least one container was identified as a PT container while in transit. This step provides some early warning signal to a crew of the cargo ship while in transit.

In one embodiment of the present invention, the step of tracking and reporting position coordinates and security status of each PT cargo container to an appropriate party (step 20 of FIG. 1) further comprises the following steps (not shown): checking at least one generated SST signal to verify the security status of at least one PT container while in transit; and if at least one SST signal is confirmed to be a false positive SST signal, changing the security status of at least one PT container associated with the false positive SST signal to an indefinite security status (ISS) cargo container. This step provides an extra assurances that the security status of a PT container will be either confirmed, or changed to an ERP status.

Similarly, in one embodiment of the present invention, the step (26 of FIG. 1) of tracking and reporting position coordinates and security status of an ERP cargo container to an appropriate party further comprises the steps (not shown) of substantially continuously checking the security status of each ERP container while in transit by using at least one threat detector to detect a previously undetected (PU) SST signal; and if at least one ERP container generates a previously undetected (PU) SST signal, changing the security status of at least one ERP container associated with the PUSST signal to an indefinite security status (ISS) cargo container.

In one embodiment of the present invention, more specifically, the step of changing the security status of at least one ERP container associated with the previously undetected (PU) SST signal to an indefinite security status (ISS) cargo container further comprises the following steps (not shown): activating at least one RFID tag associated with the PUSST signal to indicate the change in the classification of at least one cargo container from the ERP security status to the ISS security status; and generating an alarm signal when at least one ERP container changes its security status from the ERP security status to the ISS security status.

Based on the disclosed above specific steps, more broadly, in one embodiment of the present invention, the step of tracking and reporting position coordinates and security status of each PT cargo container to an appropriate party (step 20 of FIG. 1) further comprises the step (not shown) of substantially continuously updating and reporting an electronic identity of each PT container. In one embodiment of the present invention, the electronic identity of a PT container comprises a plurality of parameters selected from the group consisting of: {a security status of the PT container; an alarm event associated with the PT container; an electronic transmission to each appropriate party of an alarm event associated with the PT container; and a change in security status of the PT container due to a false positive SST signal to an ISS status}.

Similarly, in one embodiment of the present invention, the step (26) of tracking and reporting position coordinates and security status of an ERP cargo container to each appropriate party further comprises the step (not shown) of substantially continuously updating and reporting an electronic identity of the ERP container. In one embodiment of the present invention, the electronic identity of an ERP container comprises a plurality of parameters selected from the group consisting of: {a security status of the ERP container; a change in security status of the ERP container due to a PUSST signal; an alarm event associated with the PUSST signal; and an electronic transmission to each appropriate party of the alarm event associated with the PUSST signal}.

In one embodiment of the present invention, the step of tracking and reporting position coordinates and security status of a PT cargo container to each appropriate party (step 20 of FIG. 1) further comprises the step (not shown) of reporting the position coordinates of the PT container by using a reporting means. Similarly, in one embodiment of the present invention, the step (26 of FIG. 1) of tracking and reporting position coordinates and security status of an ERP cargo container to an appropriate party further comprises the step (not shown) of reporting the position coordinates of each ERP container by using a reporting means. The reporting means is selected from the group consisting of: {a cellular phone; a radio; a TV transmitter; a satellite phone; a cable; and a website/portal of the ERP website-based system}.

Homeland Security with the Coast Guard is currently using ORBCOMM's satellites for ocean vessel tracking in some way. The same ORBCOMM's satellites technology can be used in the present invention for reporting purposes. ORBCOMM, located at 21700 Atlantic Boulevard, Dulles, Va. 20166 USA, is a satellite data communications company that provides innovative satellite communication services at down to earth prices. The satellite-based network provides customers around the world with reliable global coverage and the added value of tailored application service and support. The ORBCOMM System uses low-Earth orbit (LEO) satellites to provide cost-effective tracking, monitoring and messaging capabilities to and from anywhere in the world. Similar to two-way paging or e-mail, the ORBCOMM's system is capable of sending and receiving two-way alphanumeric packets of data. These short, economical messages increase the efficiency of remote operations by making critical information readily available, often from areas beyond the geographic and economic reach of traditional systems.

Figure 2:
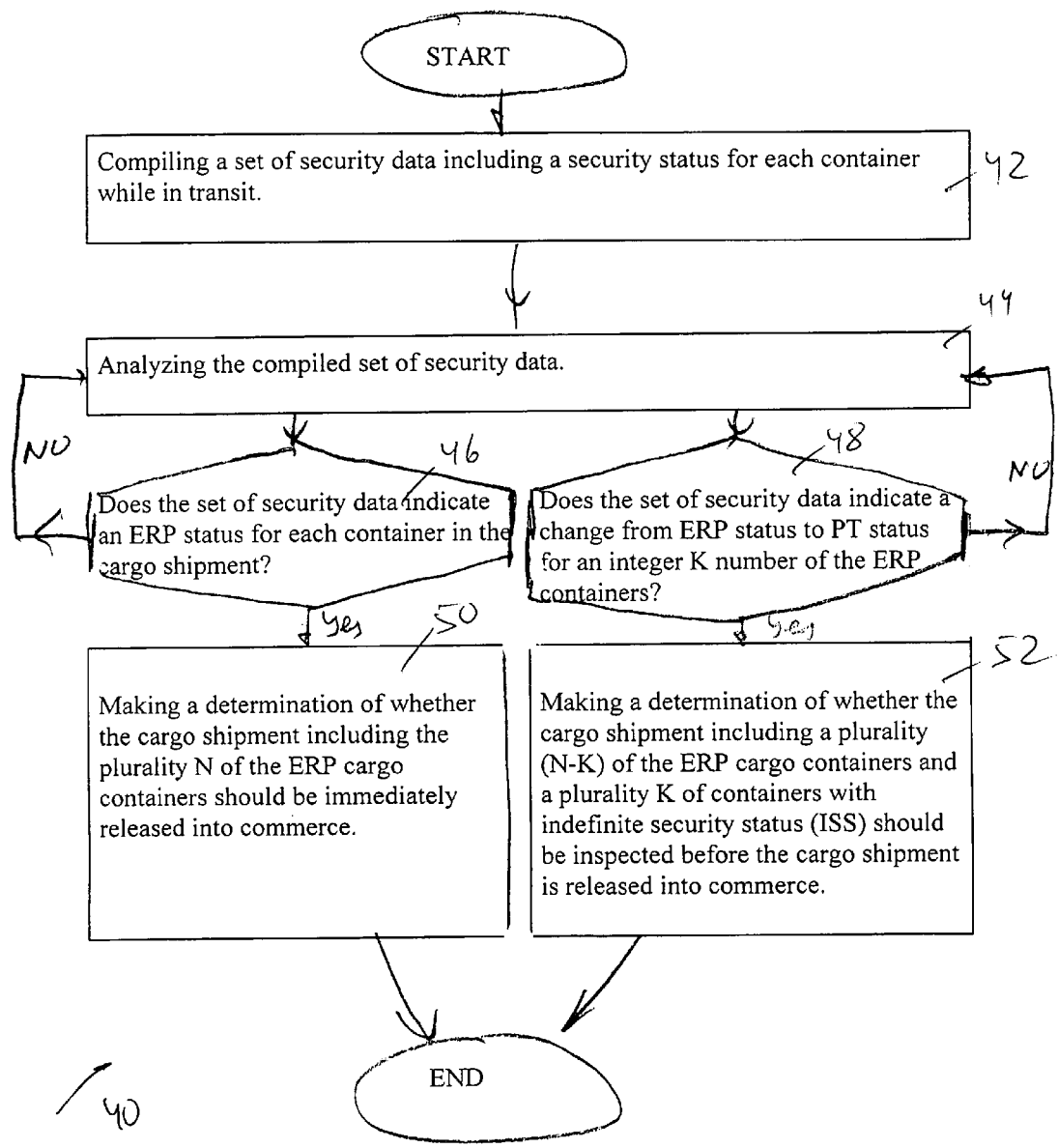
FIG. 2 is a flow chart that details the step of expediting the release procedure at at least one border crossing or at least one customs entry point of an ERP cargo container.

In one embodiment of the present invention, FIG. 2 is a flow chart 40 that details the step (28 of FIG. 1) of expediting the release procedure at least one border crossing or at least one customs entry point of an ERP cargo container.

In one embodiment of the present invention, more specifically, the step (28 of FIG. 1) further comprises the following steps: (step 42) compiling a set of security data including a security status for each container while in transit; (step 44) analyzing the set of security data compiled in the step (42); and if the test condition 46 is satisfied, that is, if the set of security data indicates an ERP status for each container in the cargo shipment, making a determination of whether the cargo shipment including the plurality N of the ERP cargo containers should be immediately released into commerce (step 50).

If, on the other hand, the test condition 48 is satisfied, that is the set of security data indicates a change from ERP status to PT status for an integer K number of the ERP containers, the flow chart 40 of FIG. 2 includes the step of making a determination of whether the cargo shipment including a plurality (N-K) of the ERP cargo containers and a plurality K of containers with indefinite security status (ISS) should be inspected before the cargo shipment is released into commerce (step 52).

Figure 3:
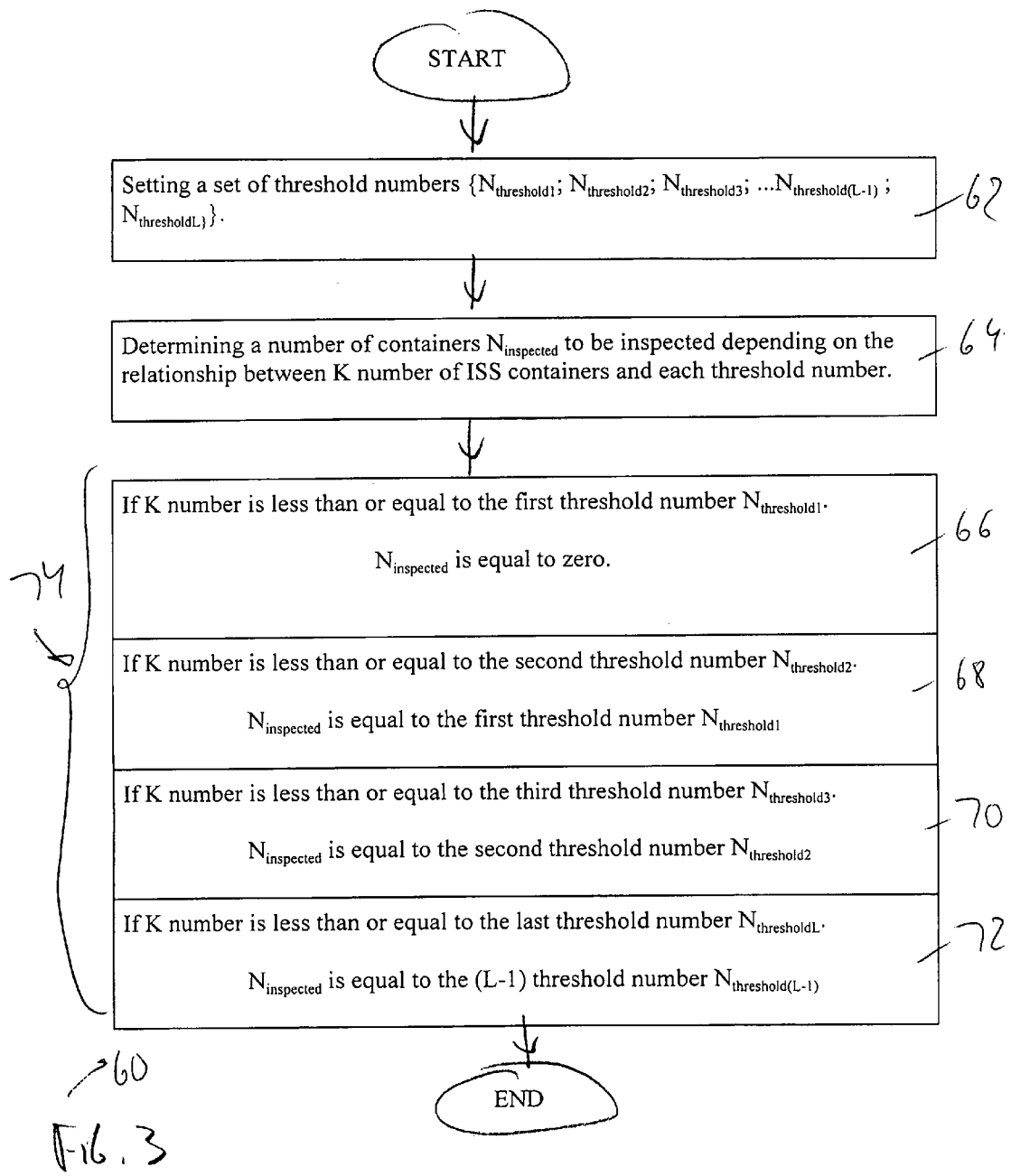
FIG. 3 illustrates a flow chart of the step of making the determination of whether the cargo shipment including the plurality (N-K) of ERP cargo containers and the plurality K of ISS containers should be inspected before the cargo shipment is released into commerce in more details.

In one embodiment of the present invention, FIG. 3 illustrates a flow chart 60 that illustrates the step of making the determination of whether the cargo shipment including the plurality (N-K) of ERP cargo containers and the plurality K of ISS containers should be inspected before the cargo shipment is released into commerce in more details.

More specifically, the flow chart 60 of FIG. 3 includes the following steps: (step 62) setting a set of threshold numbers; and (step 64) determining a number of containers $N_{inspected}$ to be inspected depending on the relationship between K number of ISS containers and each threshold number.

In one embodiment of the present invention, more specifically, the flow chart 60 includes the following steps: (step 62) setting a set of threshold numbers $\{N_{threshold1}; N_{threshold2}; N_{threshold3}; \ldots N_{threshold(L-1)}; N_{thresholdL}\}$; L is an integer; and (step 64) determining a number of containers $N_{inspected}$ to be inspected depending on the relationship between K number of ISS containers and each threshold number.

In one embodiment of the present invention, $N_{inspected}$ is equal to zero if K number is less than or equal to the first threshold number $N_{threshold1}$ (box 66); $N_{inspected}$ is equal to the first threshold number $N_{threshold1}$ if K number is less than or equal to the second threshold number $N_{threshold2}$ (box 68); $N_{inspected}$ is equal to the second threshold number $N_{threshold2}$ if K number is less than or equal to the third threshold number $N_{threshold3}$ (box 70); and $N_{inspected}$ is equal to the (L-1) threshold number $N_{threshold(L-1)}$ if K number is less than or equal to the last threshold number $N_{thresholdL}$ (box 72).

Referring still to FIG. 1, in one embodiment of the present invention, the step (28) of expediting the release procedure at least one border crossing or at at least one customs entry point of each ERP cargo container further comprises the step (not shown) of using a secure ERP website-base system to expedite the release procedure at least one border crossing or at least one customs entry point of each ERP cargo container.

In one embodiment of the present invention, the secure ERP website-based system is configured to collect and to process a set of combined data selected from the group consisting of: {a set of normal commercial transaction data; a set of transport data; a set of RFID data; a set of satellite navigational tracking data; a set of threat signal data; and a set of security status data}.

In one embodiment of the present invention, the set of combined data is a collection of inputs from a supply chain selected from the group consisting of: {each container entering at least one border crossing or at least one customs entry point; the customs at least one destination country; a network of shippers; a network of consignees; a network of forwarders; a plurality of terminals; and a network of carriers}.

In one embodiment of the present invention, the step (not shown) of using the secure ERP web-site based system to expedite the release procedure at least one border crossing or at least one customs entry point of each ERP cargo container further comprises the following steps: utilizing the set of data selected from the group consisting of: {the RFID data; the set of satellite navigational tracking data; and the set of threat signal data} to indicate a physical location of at least one ISS cargo container that will be submitted for customs clearance within a predetermined distance and time of arrival from a port of discharge and/or port of entry; and using the secure ERP website-based system configured to enable the preparation and population of a set of ERP data documentation for the expedite release procedure for each ERP cargo container including a set of data selected from the group consisting of: {a set of commercial invoices; a set of packing lists; a set of manifests; a set of Bills of Lading; a set of commercial documents including a certificate of origin, manufacturer safety data sheets, pre-shipment cargo inspection reports, documentary collections, quota certificates, solid wood packing declarations; and a set of customs entry data}.

In one embodiment of the present invention, the current location of each ISS cargo container that generated at least one previously undetected SST (PUSST) signal is posted on the secure ERP website. In this embodiment of the present invention, a predetermined number of the ISS cargo containers in the cargo shipment should be physically inspected at least one border crossing or at least one customs entry point or at port of customs entry. On the other hand, in this embodiment of the present invention, each ERP cargo container is immediately released into the stream of commerce without being physically inspected at the border crossing or at least one customs entry point.

Figure 4:
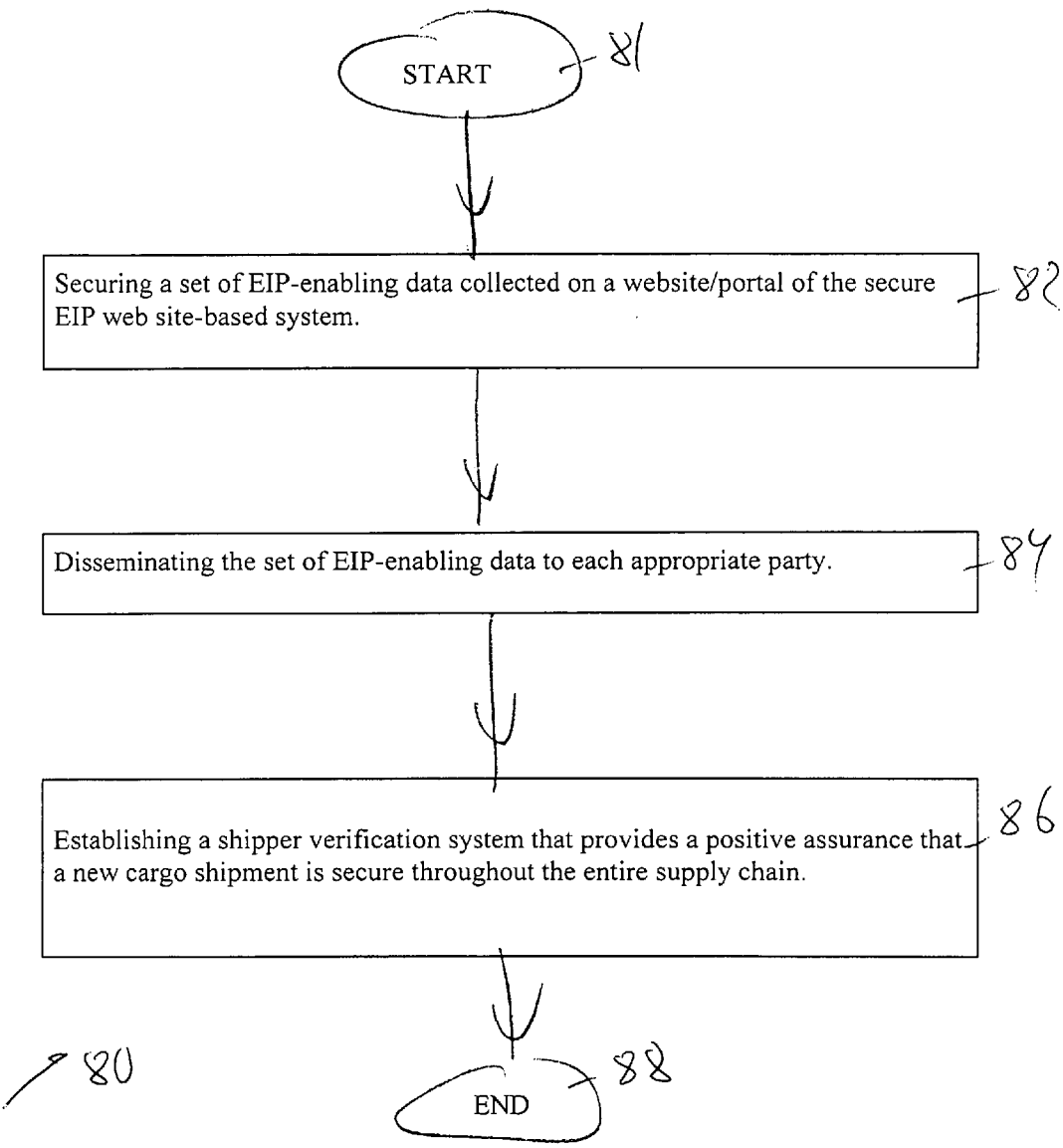
FIG. 4 is a flow chart that illustrates the usage of the secure ERP website-based system configured to enable the preparation and population of the set of ERP data documentation for the expedite release procedure for each ERP cargo container in more details.

In one embodiment of the present invention, FIG. 4 is a flow chart 80 that illustrates the usage of the secure ERP website-based system configured to enable the preparation and population of the set of ERP data documentation for the expedite release procedure for each ERP cargo container in more details.

More specifically, the flow chart 80 includes the step of securing a set of ERP-enabling data collected on a website/portal of the secure ERP website-based system (step 82); the step of disseminating the set of ERP-enabling data to an appropriate party (step 84); and the step of establishing a shipper verification system that provides a positive assurance that a new cargo shipment is secure throughout the entire supply chain (step 86).

In this embodiment of the present invention, the ERP-enabling data is selected from the group consisting of: {a consignee data including a customs broker data; a shipper data; a carrier data including a port/terminal data from the port of departure; and a customs/Automated Brokerage Interface (ABI)/Other Governmental Agency (OGA) data}.

In this embodiment of the present invention, the ERP-enabling data comes from each appropriate party located anywhere in the world. In this embodiment of the present invention, an appropriate party is selected from the group consisting of: {the consignee; a customs broker; the shipper; the carrier; the port and terminal operator; the customs; a designated agent of the consignee; a designated agent of the customs broker; a designated agent of the shipper; a designated agent of the carrier; a designated agent of the port and terminal operator; and a designated agent of the customs}.

In one embodiment of the present invention, FIG. 5 illustrates a flow chart 90 of establishing the shipper verification system in more details.

In order to provide positive assurance that the cargo is secure throughout the entire supply chain, it should be verified as being 'safe' before the container is sealed. The present invention establishes a procedure that would be endorsed or mandated by the Customs and Border Protection (CBP), and that would establish a global network of authorized agents that would complete an initial verification visit on a shipper. This initial verification procedure would positively verify that the would-be shipper has established safety procedures that conform to government standards such as C-TPAT (Customs and Trade Partnership Against Terrorism) (step 94 of FIG. 5), and would nominate an employee of the company to be the named security officer or empowered person that is responsible for supervising loading and declaring containers safe before they are sealed (step 96 of FIG. 5).

The agent would enter the verification data into a database (step 98 of FIG. 5). This data could be linked to a unique shipper id code such as the Manufacturer ID Code. The shipper would keep records of the verification process. Once the shipper is verified and established in the database, he will be a "known" shipper to U.S. Government. The appointed network of agents will be entitled and mandated to make periodical surprise visits at the shipper to ensure ongoing compliance with the program.

Assuming the shipper is verified, he will load the cargo and declare if it is safe (step 100 of FIG. 5). He will then immediately seal the container with a smart container seal. Containers that arrive at the border with seal intact and no alarm events that occurred in transit could be fast tracked through the clearance process.

Referring still to FIG. 5, more broadly, the flow chart 90 includes the following step: (step 94) establishing a global network of authorized unprejudiced agents that could complete an initial verification on each particular shipper to make sure that the shipper has established a safety procedure that conforms top the USA government, or to a set of international standards yet to be determined. At the next step 96, an employee of the company is nominated to be named a security officer, or an 'empowered person' that is responsible for supervising loading of each new cargo shipment and declaring each cargo container safe before it is sealed. The security officer confirms that the documentation is correct and no smuggling is intended. The security officer also confirms that each cargo container is sealed.

The flow chart 90 (of FIG. 5) further includes the step of entering the verification data linked to a unique shipper ID code into a verification database by the authorized unprejudiced agent (step 98). The unique shipper ID code is similar to or is directly tied to the customs concept of a Manufacturer ID code. The shipper is enrolled into a database of "known" shippers once the shipper ID code has been entered into the verification database. The verification database and the known "shippers" database are accessible via the secure ERP website-based system by a user having a proper registered username and a proper registered password.

Finally, the flow chart 90 (of FIG. 5) includes the steps of declaring the cargo safe from the SST signals to Homeland Security, conforming the cargo with the set of issued commercial documentation, and initiating the physical movement of the cargo after the shipper is verified (step 100).

In one embodiment of the present invention, FIG. 6 depicts a flow chart 110 that details the usage of the secure ERP website-based system configured to enable the preparation and population of the set of ERP data documentation for customs entry transmission for each ERP cargo container.

The flow chart 110 comprises the step of obtaining an account by a party who is responsible for payment and coordination of the cargo shipment with a website/portal provider of the secure ERP website-based system and or/obtaining an account by the party who is responsible for payment and coordination of the cargo shipment directly with customs at the country of destination (step 114). The party who is responsible for payment and coordination of the cargo shipment is selected from the group consisting of: {a consignee; a shipper; or a third party that is responsible for the payment and coordination of the cargo shipment}.

At the next step 116, the flow chart 110 comprises the step of logging in into the obtained account by the party who is responsible for payment and coordination of the cargo shipment to generate a new cargo shipment that is identified by a unique cargo shipment number. At the step 118, a purchase order is generated by the party who is responsible for payment and coordination of the cargo shipment. At the step 120, commercial invoice is generated by the shipper. The step 122 is a step of generating a manifest transmission & Bill of Lading (B/L) info by the carrier and/or a freight forwarder. At the step 124, the review of Entry Data is performed by the customs broker and/or an importer of record and by the party who is responsible for payment and coordination of the cargo shipment to correct any possible errors or to make clarifications before transmission. The step 126 is the step of generating a signal to trigger transmission of customs entry by the website/portal of the ERP website-based system when a cargo container is within a predetermined length of time away from arrival at a physical border. At the step 128, the customs release data is disseminated to appropriate parties by customs via the website/portal of the ERP website-based system, whereas at the step 130, the cargo release data is disseminated by the carrier and or by the freight forwarders to each appropriate parties via the website/portal of the ERP website-based system.

Finally, at the step 132, the system reverts to the standard methods of submission of customs entry and documents (via traditional ABI transmission or by submitting hard copies of actual documents) to customs in the event that any such data is missing, or rejected, or if customs or other governmental agency is to more closely review the shipping and commercial documents. The standard methods of submission of customs entry and documents include using a standard customs rejection procedure and filing of a correction procedure if any such data is missing or rejected.

In one embodiment of the present invention, an account of the party who is responsible for payment and coordination of the cargo shipment is linked to a set of data selected from the group consisting of: {a predetermined PIN # and/or password; a Federal Tax ID# of the party who is responsible for payment and coordination of the cargo shipment; a Bond type; a surety code; a primary delivery warehouse; a set of delivery locations; a list or database of the Harmonized Tariff numbers for all imported goods for the party who is responsible for payment and coordination of the cargo shipment; and a set of relevant customs binding rulings}.

Certain information is not needed or used by the shipper and is typed in Italics. For Example: SKU numbers; Importer's account number including Federal Tax ID, the consignees federal tax number, delivery address, binding ruling number. Consignee or importer might not want the shipper to know where the goods are going or who they will ultimately be sold to.

In one embodiment of the present invention, FIG. 7 is a flow chart 140 that illustrates the step of generating a purchase order by the party who is responsible for payment and coordination of the cargo shipment in more details.

At the step 144, the PIN# is used to generate the purchase order based on a set of data selected from the group consisting of: {a supplier contact info; a consignee contact info; a number of pieces being purchased; a purchase price per item; a currency of transaction; customs harmonized Codes for each item being purchased and/or shipped; Commercial Bill of Lading (B/L) Description of goods; Purchaser's sku #s of the goods; date of purchase order; INCO Terms; a desired mode of transport; a desired carrier; related parties (yes/no); an Importer's account number including Federal Tax ID#; binding ruling number; an ach payment type; OGA filing codes; and final delivery address and contact info}.

Referring still to FIG. 7, at the next step, the PIN# is used to control access to the new cargo shipment and to grant access to the new cargo shipment to a set of appropriate parties selected from the group consisting of: {at least one shipper; at least one custom broker; at least one forwarder; and at least one carrier} (step 146). The PIN# is also used to update a set of account data selected from the group consisting of: {an update to delivery address; an update to customs entry; an update in value; and other relevant updates that may occur while the cargo shipment is enroute} (step 148). Finally, an audit trail is established with each update of the account data to specifically identify a party which is responsible for the relevant updates, or to specifically identify a party which authorized the relevant updates (step 150).

In one embodiment of the present invention, the step of generating a commercial invoice by the shipper further comprises the step (not shown) of confirming a set of data selected from the group consisting of: {a supplier contact info; a consignee contact info; a number of pieces being shipped; a sales price per item and a total price; a currency of transaction; a commercial Bill of Lading (B/L) description of goods; seller's sku #s of the goods; a date of invoice; INCO Terms; a mode of transport; a type of packaging units of measure; a SWP declaration; a net weight/gross weight/volume; a number of containers; a type of equipment; a seal number; a vessel; a voyage #; a SCAT code; BL#s; and a country of origin per item}.

In one embodiment of the present invention, the step of generating a manifest transmission & Bill of Lading (B/L) info by said carrier and/or a freight forwarder further comprises the following steps (not shown): sending a manifest to Customs and Border Protection (CBP) and initiating data for Bill of Lading (B/L) and Arrival Notice by specifying a set of data selected from the group consisting of: {a port of Lading: a port of Unlading; a place of delivery; IT #s and dates; and bonded carrier details}; and confirming arrival of said cargo shipment at loading pier by using a Smart Container lock/Strongbox device.

Figure 8:
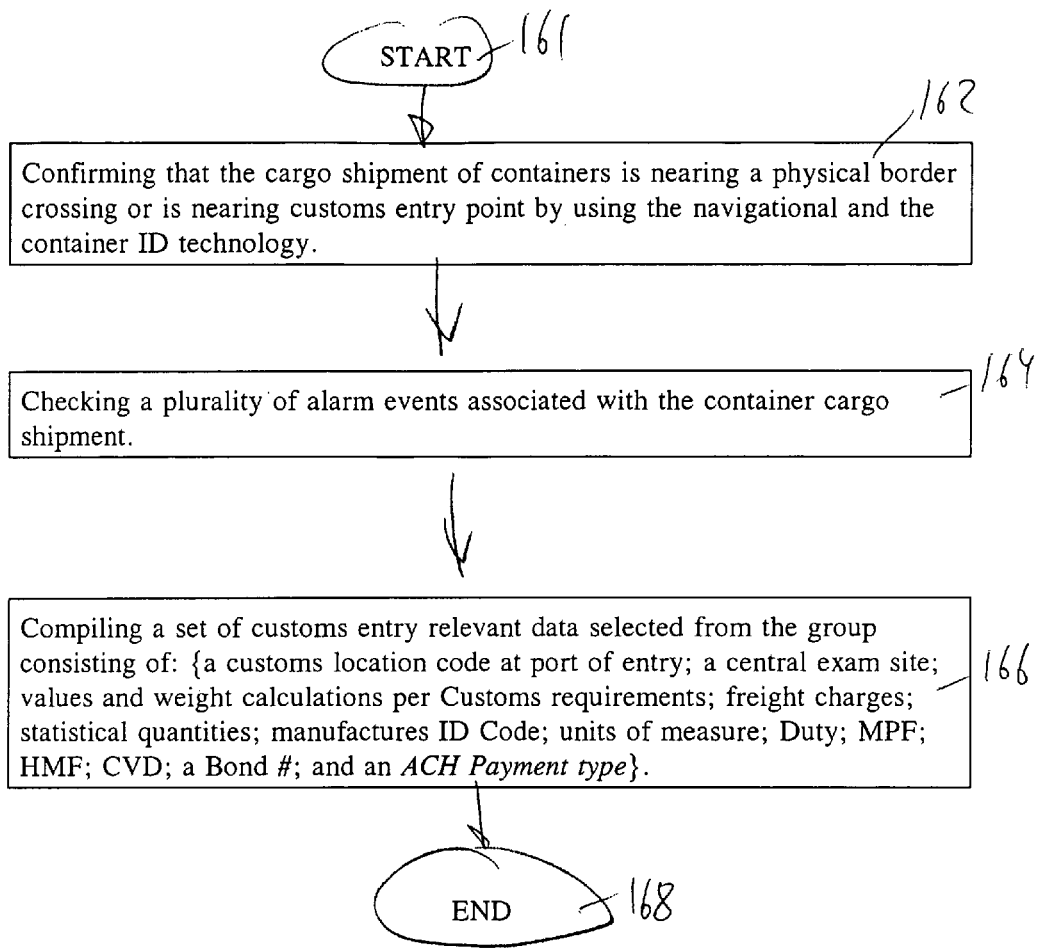
FIG. 8 illustrates a flow chart that shows the step of generating a signal to trigger transmission of customs entry by the website/portal of the ERP website—based system when a cargo container is within a predetermined length of time away from arrival at a physical border.

In one embodiment of the present invention, FIG. 8 illustrates a flow chart 160 that shows the step of generating a signal to trigger transmission of customs entry by the website/portal of the ERP website-based system when a cargo container is within a predetermined length of time away from arrival at a physical border.

In one embodiment of the present invention, the flow chart 160 of FIG. 8 comprises the following steps: (step 162) confirming that the cargo shipment of containers is nearing a physical border crossing or is nearing customs entry point by using the navigational and the container ID technology; (step 164) checking a plurality of alarm events associated with the container cargo shipment; and (step 166) compiling a set of customs entry relevant data selected from the group consisting of: {a customs location code at port of entry; a central exam site; values and weight calculations per Customs requirements; freight charges; statistical quantities; manufactures ID Code; units of measure; Duty; MPF; HMF; CVD; a Bond #; and an ACH Payment type}.

In one embodiment of the present invention, the step of checking the plurality of alarm events associated with the container cargo shipment further comprises the step (not shown) of increasing the frequency of periodically checking alarm events associated with the SST signals when the cargo ship approaches an arrival port.

For example, the user gets to define how often a data sample is taken. The sample rate can be taken from a variety of options, starting with once per day, but leaving open the options to tailor the testing based on proximity to harbor, port, or land.

In another embodiment of the present invention, the step of checking the plurality of alarm events associated with the container cargo shipment further comprises the step (not shown) of programming the frequency of periodically checking alarm events associated with the SST signals to take into account nearing approach to a harbor.

For example, one would like to include the programmable capability of altering the test sample rate, or period, to take account of a nearing approach to a harbor where further unloading and possibly additional testing might be performed. The tests could be done on a more regular basis as one gets to prescribed distances from the harbor: 10 miles, 5 miles, 2 miles 1 mile, 0.5 mile, 0.3 mile, 0.1 mile. So, while at sea, the test are done at the rate of "one test per week," the rate of testing would increase to "one test per day" as the ship gets to within 100 miles of a destination port.

In one more embodiment of the present invention, the step of checking the plurality of alarm events associated with the container cargo shipment further comprises the step (not shown) of unloading of additional testing to be performed as the ship is within the 12 mile international water boundary limit of any country, whether a destination country or not. Indeed, additionally, tests should be performed more often as the ship gets to within the 12 mile international water boundary limit; i.e., gets to within territorial waters of any country, whether a destination country or not.

In one embodiment of the present invention, FIG. 9 depicts a flow chart 170 that details the step of disseminating the customs release data to appropriate parties by customs via the website/portal of the ERP website-based system.

In one embodiment of the present invention, the flow chart 170 further comprises the following steps: (step 174) checking whether customs has indicated that the cargo shipment is cleared and able to be released into commerce; (step 176) checking Customs 7501 form; wherein the Customs 7501 form known as the 'Entry Summary' details a set of substantially significant data that is required to be submitted to customs prior to release; (step 178) checking Customs 3461 form; wherein the Customs 3461 form is signed by customs or a responsible broker upon release of goods from customs; and (step 180) initiating any other liquidation data or administrative messages.

In one embodiment of the present invention, the step of disseminating the cargo release data by the carrier and or by the freight forwarders to an appropriate party via the website/portal further comprises the step (not shown) of disseminating the cargo released data in a method similar to the current Automated Manifest System (AMS).

EXAMPLE I

Generation of the Load Code

A container is loaded at a factory in Hong Kong. The warehouse manager or responsible party goes to the website and fills out an online form. The form requires the following data points:

(1) The shipper's (loading company) company name, address, postal code, telephone, fax, email, general contact name.

(2) Full name of the person taking responsibility to enter in "Load Code".

(3) Commodity of cargo being shipped (ideally it would use the first 8 or 10 digits of the Harmonized Tariff Customs Code, but in the beginning it could just be a written description such as "automotive engine parts").

(4) Intended loading port (i.e. Hong Kong). The port would be selected from a pull down menu that lists all the world's ports. The idea of using the pull down menu for the ports is to standardize the data. One doesn't want some warehouse guy in Hong Kong getting Portland, Oreg. and Portland, Me. confused. There is an additional benefit of this particular implementation in that U.S. Customs already recognizes every port in the world as either 5 digits (for a foreign port code) or 4 digits (for a domestic USA port code). This information can eventually be used to drive the manifesting process. Currently, ocean carriers are required to report their entire manifests to U.S. Custom 48 hours before they depart the foreign port of lading.

(5) Intended discharge port (i.e. Los Angeles). The port would be selected from a pull down menu that lists all the world's ports.

(6) The consignee's (receiving company) company name, address, telephone, fax, email, contact name.

(7) Container number. (8) Seal number. (9) Loading date and local time that container is sealed.

Once this information is keyed in to the website, the website will provide a valid container description LOAD CODE. This load code is sent to the Automated Export System (AES) (via key pad, palm pilot, blackberry, cellular, etc) and activates the Smart Container Lock/Strongbox that locks the container. It is important to note that the shipper will usually have all the details of these data points already on hand when they are loading a container. They need the info anyway to generate their commercial invoices and other documents. Destination interface records UNLOAD CODE, local time and GPS coordinates, at time of deactivation. The standardization of data points will serve two purposes: 1. It will help sell the product to the carriers as an efficiency point. 2. This will eventually simplify the entire shipping process and will ultimately bring the biggest change to international commerce since the advent of containers. The Smart Container Lock/Strongbox technology should be used to ultimately store and transmit all data points required to drives the entire documentation process of international shipping, including generating commercial documents, manifesting, customs declarations, customs clearances, and Bills of Lading generation.

EXAMPLE II

Life Cycle of a Trip

1. Dispatcher logs onto ERP website and creates a new trip log.

2. Dispatcher enters all required trip information, including destination GPS coordinates 3. Dispatcher retrieves Smart Container lock/Strongbox device from inventory of available units and ensures it is fully charged—either new AA batteries or fully recharged in the re-charger unit.

4. Dispatcher enters unique security code identifier into the system to synchronize Smart Container lock/Strongbox devices.

5. Dispatcher sends access code to Smart Container lock/Strongbox device and identification code for cargo shipment to destination via secure e-mail—receiver can now track cargo shipment progress on the web and set notification parameters ( . . . e.g. notify when load is 100 km away . . . ).

6. Warehouseman attaches Smart Container lock/Strongbox device to load and locks it—locking event is transmitted by the Smart Container lock/Strongbox device to the ERP website via cellular message.

7. Driver is given entry code/smart card and 800 number to call in the event of a need to get authorization for entry.

8. Uneventful trip: Smart Container lock/Strongbox device transmits regular location signals throughout trip and transmits positive notification of delivery event when it reaches the GPS coordinates indicated for the destination; Smart Container lock/Strongbox device is opened using access code and Smart Container lock/Strongbox device transmits event that it has been opened.

9. Opening event relieves shipper of product liability and triggers invoice generation.

10. Smart Container lock/Strongbox device is recharged by either inserting new batteries (AA scenario) or by placing in recharging unit, and is available for either return load, redeployment by the receiver, or return to the shipper via courier.

11. Trip summary report is made available on the web for the shipper and is combined into monthly summary reports for all shipping activity by the shipper, enabling statistics such as average length of haul, average transit time, average speed, average # stops/events/openings etc.

EXAMPLE III

In-Transit Events

1. Customs inspection: Driver enters access code, Smart Container lock/Strongbox device opens and transmits opening event time and location. Driver closes Smart Container lock/Strongbox device after inspection and Smart Container lock/Strongbox device transmits closing event time and location.

2. Unauthorized tampering event: Smart Container lock/Strongbox device transmits alarm event, time and location. Change of trip plan (requires signal reception capability on Smart Container lock/Strongbox device): Dispatcher enters new destination information and GPS coordinates into ERP website. Command center transmits signal to Smart Container lock/Strongbox device that changes GPS coordinates for destination. Smart Container lock/Strongbox device sends confirmation of receipt of message and time and location of change message being received.

3. Low power: Smart Container lock/Strongbox device sends low power alarm message at the predetermined level of battery depletion with location and time.

EXAMPLE IV

Advanced Functionality Scenarios

A. Customs Fast-Tracking.

1. Shipper is pre-certified and pre-cleared for having ISO9000 quality standards and security standards.

2. Customs is notified by the ERP website that the cargo shipment has begun and the expected border crossing point.

3. The Smart Container lock/Strongbox device sends a signal to the web that alerts customs when it is 25 km from the border.

4. Customs gives fast-track green light to the cargo shipment to proceed through the pre-clearance lane if it has clear evidence that the load has not been opened since leaving the shipper's dock.

B. Terminal processing.

1. Smart Container lock/Strongbox device is attached to a container at the shipper's loading dock.

2. Truck approaches a rail intermodal terminal.

3. Smart Container lock/Strongbox device signals arrival to ERP website, which transmits load information directly to the terminal gate.

4. Terminal gate directs truck to location for drop-off.

EXAMPLE V

Usage of Smart Container Lock/Strongbox Technology

A) External Lock/Strongbox Screen should display:

1. Unit working and communicating with Automated Export System (AES)—(yes/no).

2. Battery OK/Not OK.

3. Container number.

4. Seal number.

5. Seal integrity (still intact yes/no).

5. Alerts have been raised (yes/no).

6. Active alert status light on the external unit. i.e. a strobe or blinking light if the unit is in Alert Mode.

7. Monitoring unit displaying: Container number/Seal Number.

8. Seal integrity (still intact yes/no);—Alerts have been raised (yes/no).

9. Load Code accepted/not accepted (load code should be encrypted so that unit only shows asterisks).

The external unit should have a keypad (10 digits plus enter) to enter in LOAD CODE and UNLOAD CODE. Benefits: It does not require the loading warehouse or unloading warehouse to have any special equipment like a palm pilot or blackberry.

11. User interface:—Accessable via website.

B) Registration

Users should register and get a pin. Different levels of security access are granted at time of registration. For example, (a) carriers will need some level of access for all containers in their fleet; (B) shippers will need access to LOAD CODE; (c) consignees will need access to UNLOAD CODE; (d) customs will need access to 'see' every container and to override code. Every time a particular container is queried, the system records the pin of the person doing the query. One can only query containers that pass some sort of cross reference test. For instance, when one registers for a pin, one has to key in one's company name. One's pin can only query containers that are being shipped to/from one's company. Carrier pins can only query containers in their fleet. Customs can query any container. The website will allow GPS/RFID real time tracking of unit. This information can eventually be linked to a carrier's website or port terminal website in order to see planned movements.

C) Customs Override.Customs and other governmental agencies should have a general override code that changes daily and is pulled down from the website. each customs officer is assigned their own personal pin. To get their personal override code for the day, they have log into the website and enter their pin. They are then provided with a code that can allow the external lock unit on all containers to be accessed for that particular 24 hour period. The unit would of course record the access and the pin and code that was used to access. Alerts can be sent if a customs override code was being used in New York but the inspector logged in that day in Los Angeles.

Another aspect of the present invention is directed to a system for expediting a release procedure of at least one cargo container at least one border crossing or at least one customs entry point by detecting each statistically significant threat (SST) signal associated with at least one cargo container while in transit, and by tracking and reporting to each appropriate party the position coordinates and a security status of each cargo container that generated at least one SST signal. The appropriate party is selected from the group consisting of: {Homeland Security agency; and a cargo security agency}; wherein the cargo security agency is further selected from the group consisting of: {a consignee; a steamship line; a customs broker; a freight forwarder; and a terminal operator}.

In one embodiment of the present invention, the system comprises (not shown): (A) a means for detecting at least one SST signal associated with at least one cargo container while in transit; wherein each SST signal generates a threat signal having a threat probability higher than a predetermined threshold; (B) a means for identifying each cargo container that generated at least one SST signal; a means for classifying the security status of a cargo container as a Potential Threat (PT) cargo container; and a means for classifying the security status of a cargo container as an Expedited Release Procedure (ERP) cargo container; C) a means for tracking and a means for reporting position coordinates and the security status of each PT cargo container to each appropriate party; (D) a means for tracking and a means for reporting position coordinates and the security status of each ERP cargo container to each appropriate party; and (E) a means for expediting the release procedure at least one border crossing or at least one customs entry point of each ERP cargo container.

The disclosed above, secure ERP website-based system achieves the following goals:

(A) To create a single source for data collection, transmission, review.

(B) To expand and improve the C-TPAT, Automated Commercial Environment (ACE), Container Security Initiative (CSI), Operation Safe Commerce (OSC), and other U.S. Customs programs.

(C) To advance the realization and utilization of "Smart Container" Technology.

(D) To allow governments to conclusively pre-determine if a container needs to be physically inspected and fast track release of cargo into commerce.

(E) To streamline, standardize, and automate the documentation processes and prevent errors.

(F) To keep the balance between gathering of intelligence and flow of commerce.

(G) To expedite customs and OGA (Other governmental agency) entry processing.

(H) To reduce re-keying of data and create efficiencies.

(I) To create an audit trail of documentation.

(K) To allow consignee to 'drive' data on customs entry (Informed Compliance), Bills of lading, Arrival notices.

(J) To allow customs and OGAs to verify redundancy in data and to better identify at-risk cargo shipments.

(L) To eventually allow electronic nesting of information from supply chain and produce "Census Data" for customs analysis.

(M) To eventually tie in RFID technology with container manifesting and clearance processes.

(N) To allow Customs to "Fast Track" C-TPAT clients and their cargo shipments.

(S) To interface with logistics and enterprise resource systems to provide greater visibility into supply chains and inventories.

(T) To give importers and exporters greater planning and control of costs.

The implementation of the disclosed above, secure ERP website-based system (1) First target will be repetitive ocean cargo shipments and NAFTA truck border crossings for Pre-Arrival Processing System (PAPS) and for the Free And Secure Trade (FAST) programs.

(2) The first step-generation of the commercial documentation.

(3) The next step-Manifest generation.

(4) The following step-generation of the Bill of Lading (B/L) and generation of the Arrival notices.

(5) The next step-obtaining the Customs clearance.

(6) The following step-obtaining clearance from Other Governmental Agencies.

(7) The next step-to guarantee the trade financing.

(8) The system of the present invention could be used as a model for other collaborative documentation process applications.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

APPENDIX

Glossary

ABI (automated Brokerage Interface): The standard interface that most customs brokers use to electronically transmit and receive data with Customs and Border Protection.

ACH (Automated Clearing House): The customs sponsored program used by customs brokers and importers for electronic payment (draft) of duties.ACH Payment type: each customs entry should stipulate how duties will be paid to Customs. (via broker ACH account, via an importers ACH account, direct check, etc.

ADD (Anti Dumping Duties): A punitive duty amount that is levied by customs on particular items from particular countries of origin (or even particular suppliers) that are determined by U.S. Government to be 'dumping' their products in the U.S. market at levels below costs of production.

Bill of Lading: A legal transport document that specifies what is being shipped, from where, to where, by whom, and for whom. Specific limits of liability can be detailed on the Bill of Lading.

Binding Rulings: A determination from CBP headquarters that specifies the correct Harmonized Tariff number (and therefore duty level) for an item. Without a binding ruling, the classifications are subject to the interpretation of local customs officials and duty levels can theoretically change from port to port.

Bonded Carrier: A carrier that is legally allowed and insured to carry goods that have not yet cleared customs.

Border: There is a physical border that we are all familiar with. But there is also the concept of goods traveling to interior points in the country and clearing customs upon arrival at destination. (ie goods can clear customs in Chicago, Memphis, Boise, Atlanta, etc. . . . )

Carrier: An ocean line, airline, rail line, barge, trucker, or freight forwarder that issues a Bill of Lading.

Central Exam Site: each customs port has designated central exam sites to which goods are transported for intensive customs inspections.

Consignee: The party to which goods are consigned on a Bill of Lading. (Usually the Importer)

Country of origin: The country where goods are manufactured. (This is sometimes different from the country from which they are exported.) Duties are calculated based on the country of origin. (occasionally goods may be assembled from components of various countries. In these cases, the importer, broker, or customs will follow set procedures to determine what is the legal country of origin for the customs declaration.

C-TPAT: Customs and Trade Partnership Against Terrorism. A CBP sponsored outreach such program that is designed to help importers secure their entire supply chain (including suppliers, transport vendors, warehouses, carriers, etc.) The Customs Service has developed a validation process to ensure that C-TPAT participants have implemented the security measures outlined in their Security Profile and in any supplemental information provided to Customs. The validation process will be conducted jointly by U.S. Customs personnel and a representative of the industry participant. The validation will focus on the material in the participant's C-TPAT security profile and any related materials provided by the participant and will be conducted under the guiding partnership principles of C-TPAT.

CBP: Customs and Border Protection.

Customs 3461 form: A customs form that is signed by customs or the broker upon release of goods from customs.

Customs 7501 form: Also known as the 'Entry Summary'. The 7501 details most (sometimes all) of the data that is required to be submitted to customs prior to release.

Customs Bond or Surety: Every formal customs entry should be accompanied by a bond. The bond provides insurance to customs that duties will be paid even if the importer defaults. Customs bonds can be a 'Continuous Bond' which is applicable for 365 days, or a 'Single Entry Bond' which is good only for one particular cargo shipment.

Customs broker: A person or a company that is licensed by CBP to handle customs related activities.

Customs release: The status when imported goods are released by customs in order to enter commerce. The release can be transmitted electronically (via ABI), or hard copies may be provided by customs. In some cases, both electronic and hard copies are provided CVD (Countervailing Duty: a punitive level of customs duties that is designed to discourage imports of specific items. Usually a result of trade war.

Duty: Government tax on imported goods.

Entry port: The port at which customs entry is declared. Not necessarily the port at which a cargo shipment crosses the physical border into a country.

Freight Forwarder or Forwarder: A transport broker that coordinates transport. A forwarder will often issue their own Bills of Lading and will therefore become a 'carrier' even if they do not operate the assets on which the goods are transported.

Freight (carrier) Release: The status when goods are customs cleared and the carriers and forwarders have removed any holds or restrictions on the cargo. Freight release typically comes when the fees of all transport and warehouse providers have been satisfied.

Harmonized code (Harmonized Tariff Code, HTSUS, Customs classification code: The Customs code that is used to provide a specific description (and therefore duty level) for every imported item.

HMF (Harbor Maintenance Fee): A customs fee that is charged on inbound ocean cargo shipments. The fee is approx 0.125% of the commercial value of the goods and is used to keep up the maintenance of the ports.

Importer Identification number: A unique number that is assigned to each importer. For commercial importers the number is usually the company's federal tax ID. For personal imports, it is usually a social security number.

INCO Terms: Incoterms are standard trade definitions most commonly used in international sales contracts to signify where and when goods transfer in ownership and risk from seller to buyer. They are devised and published by the International Chamber of Commerce.

ISO 900—Informed Compliance: A customs program where the importer is expected and legally required to understand and comply with customs regulations. The initial Quality Assurance Program of LSS was based on the quality management principles of ISO9000. The ISO system started after the conclusion of World War II, as European nations sought to reestablish sound economic relations with one another. Realizing they needed to develop standard ways of conducting business, they used military procurement procedures as their model. Soon, the International Organization for Standardization (ISO) was formed, comprised of approximately 100 industrialized nations. The ISO, headquartered in Geneva, Switzerland, is responsible for establishing a large number of standards.

IT (Immediate Transport) document: A document that allows goods to move within the United States before it is customs cleared. (Example would be an imported container that discharges a vessel in Los Angeles and moves in-bond under an I.T. to Memphis. It clears customs in Memphis.

Liquidation: The status of customs entry when customs basically agrees not to change the duties (There are important exceptions to this term.)

Location Code: A unique alpha numeric code that CBP designates for each customs bonded facility. The code is included on customs entry to specify the physical location of goods while they are pending customs release.

Manifest: A declaration of all goods that are being transported. Under current customs regulations, the manifest should be transmitted to CBP prior to loading of the goods at the port or airport of departure. The manifest generally details: (shipper, consignee, port of loading, port of discharge, port of destination, number of units shipped, type of packaging, weight, cubic measurement, description of the goods).

Manufacturer ID Code (MFID): A unique alpha numeric code that is assigned to the foreign manufacturer. It is generally 'built' from the company's name, address, city, country. Customs monitors the MFID's of certain manufactures that are have raised flags in the past.

MPF (Merchandise Processing Fee): A customs fee that is charged on inbound ocean cargo shipments. The fee is approx 0.21% of the commercial value of the goods and is used to support Customs.

OGA (Other governmental agency): Such as Food and Drug Administration, U.S. Fish and Wildlife, Dept of Agriculture, Dept of Commerce, Environmental Protection Agency, etc. Certain harmonized codes are flagged to direct the filer of customs entry to submit additional data to the OGA.

NAFTA: North American Free Trade Agreement.

OGA (Other governmental agency): Such as Food and Drug Administration, U.S. Fish and Wildlife, Dept of Agriculture, Dept of Commerce, Environmental Protection Agency, etc. Certain harmonized codes are flagged to direct the filer of customs entry to submit additional data to the OGA.

OGA Filing Codes: Most OGAs have their own codes (similar to Harmonized Tariff codes).

Place of delivery: The named physical location on a Bill of Lading (B/L) to which carriage is contracted.

Port of lading: The named port or airport at which a cargo shipment is loaded onboard the international carrier.

Port of unlading: The named port or airport at which a cargo shipment discharges or is unloaded from the international carrier.

RFID: Radio Frequency Identification.

SCAT code: A 4 letter code that is assigned to each bonded carrier by CBP. The SCAT code allows customs to determine which carrier is legally responsible for the in-bond status of the goods before they are customs released.

Shipper: The party on a Bill of Lading (B/L) that is stated to have shipped the goods.

SKU (Stock Keeping Unit): A unique number used by a company to designate a specific item, color, size, etc.

Statistical Quantity: each Harmonized Tariff code specifies how quantities of that item are to be reported. For example, fabrics may be reported in statistical quantities of square meters, Sugar may be reported in Kilos, Wire in Feet, Liquids in liters, shoes in pairs, etc.

SWP (Solid Wood Packing) Declaration: The U.S. and other governments have specific regulations that limit the types of wood that can be used in packing of cargo. The goal is to prevent wood that is infested with pests from entering into the country. A SWP declaration will specify if solid wood packing has been used and if it is heat treated, fumigated, hardwood, coniferous wood, etc. . . .

Terminal: Usually a pier at the port, or a rail yard, or a trucker's bonded facility. For the purposes of this invention, the terminal is a bonded facility where cargo is held until it is customs cleared.

Unit(s) of measure: A data point on customs entry that specifies how cargo is quantified. Ie, 5 pallets, 5 bundles, 5 pieces, 5 boxes, 5 cartons, 5 drums, etc.

Vessel: An ocean going cargo ship.

Voyage number: each vessel assigns a specific voyage number to each voyage. This voyage number is reported to CBP.

Weight Calculations (per customs requirements): Customs has specific requirements on how values and weights may be estimated (and declared) on cargo shipments that are comprised of multiple commodities.

What is claimed is:

1. A method of expediting a release procedure of at least one cargo container at at least one border crossing or at at least one customs entry point by detecting each statistically significant threat (SST) signal associated with at least one said cargo container while in transit, and by tracking and reporting to an appropriate party the position coordinates and a security status of each said cargo container that generated at least one said SST signal, wherein said appropriate party is selected from the group consisting of: {Homeland Security agency; and a cargo security agency}; wherein said cargo security agency is further selected from the group consisting of: {a consignee; a steamship line; a customs broker; a freight forwarder; and a terminal operator}; said method comprising the steps of:

(A) detecting at least one said SST signal associated with at least one said cargo container while in transit; wherein each said SST signal generates a threat signal having a threat probability higher than a predetermined threshold;

(B) if at least one said SST signal associated with at least one said cargo container while in transit was detected, identifying each said cargo container that generated at least one said SST signal and classifying the security status of each said cargo container as a Potential Threat (PT) cargo container; wherein each said cargo container that was not classified as said PT cargo container is classified as having a security status of an Expedited Release Procedure (ERP) cargo container;

(C) tracking and reporting position coordinates and said security status of each said PT cargo container to each said appropriate party;

(D) tracking and reporting position coordinates and said security status of each said ERP cargo container to each said appropriate party;

(E1, 1) compiling a set of security data indicating a security status for each said container while in transit;

(E1, 2) analyzing said set of security data compiled in said step (E1, 1);

(E1, 3) if said set of security data includes an ERP status for each said container in said cargo shipment, making a determination of whether said cargo shipment including said plurality N of said ERP cargo containers should be immediately released into commerce; and (E1, 4) if said set of security data indicates a change from an ERP security status to a PT security status for an integer K number of said ERP containers, making a determination of whether said cargo shipment including a plurality (N-K) of said ERP cargo containers and a plurality K of containers with indefinite security status (ISS) should be inspected before said cargo shipment is released into commerce.

2. The method of claim 1, wherein said step (E1, 4) of making said determination of whether said cargo shipment including said plurality (N-K) of said ERP cargo containers and said plurality K of ISS containers should be inspected before said cargo shipment is released into commerce, further comprises the steps of:

(E1, 4, 1) setting a set of threshold numbers; and (E1, 4, 2) determining a number of containers $N_{inspected}$ to be inspected depending on the relationship between said K number of ISS containers and each said threshold number.

3. The method of claim 1, wherein said step (E1, 4) of making said determination of whether said cargo shipment including said plurality (N-K) of said ERP cargo containers and said plurality K of ISS containers should be inspected before said cargo shipment is released into commerce, further comprises the steps of:

(E1, 4, 3) setting a set of threshold numbers $\{N_{threshold1}; N_{threshold2}; N_{threshold3}; \ldots N_{threshold(L-1)}; N_{thresholdL}\}$; L being an integer; and (E1, 4, 4) determining a number of containers $N_{inspected}$ to be inspected depending on the relationship between said K number of ISS containers and each said threshold number, wherein said $N_{inspected}$ is equal to zero if said K number is less than or equal to said first threshold number $N_{threshold1}$; and wherein said $N_{inspected}$ is equal to said first threshold number $N_{threshold1}$ if said K number is less than or equal to said second threshold number $N_{threshold2}$; and wherein said $N_{inspected}$ is equal to said second threshold number $N_{threshold2}$ if said K number is less than or equal to said third threshold number $N_{threshold3}$; and wherein said $N_{inspected}$ is equal to said (L-1) threshold number $N_{threshold(L-1)}$ if said K number is less than or equal to said last threshold number $N_{thresholdL}$.

4. A method of expediting a release procedure of at least one cargo container at least one border crossing or at least one customs entry point by detecting each statistically significant threat (SST) signal associated with at least one said cargo container while in transit, and by tracking and reporting to an appropriate party the position coordinates and a security status of each said cargo container that generated at least one said SST signal, wherein said appropriate party is selected from the group consisting of: {Homeland Security agency; and a cargo security agency}; wherein said cargo security agency is further selected from the group consisting of: {a consignee; a steamship line; a customs broker; a freight forwarder; and a terminal operator}; said method comprising the steps of:

(A) detecting at least one said SST signal associated with at least one said cargo container while in transit; wherein each said SST signal generates a threat signal having a threat probability higher than a predetermined threshold;

(B) if at least one said SST signal associated with at least one said cargo container while in transit was detected, identifying each said cargo container that generated at least one said SST signal and classifying the security status of each said cargo container as a Potential Threat (PT) cargo container; wherein each said cargo container that was not classified as said PT cargo container is classified as having a security status of an Expedited Release Procedure (ERP) cargo container;

(C) tracking and reporting position coordinates and said security status of each said PT cargo container to each said appropriate party;

(D) tracking and reporting position coordinates and said security status of each said ERP cargo container to each said appropriate party;

and (E2) using a secure ERP website-base system to expedite said release procedure at said at least one border crossing or said at least one customs entry point of each said ERP cargo container; wherein said secure ERP website-based system is configured to collect and to process a set of combined data selected from the group consisting of: {a set of normal commercial transaction data; a set of transport data; a set of RFID data; a set of satellite navigational tracking data; a set of threat signal data; and a set of security status data}; wherein said set of combined data is a collection of inputs from a supply chain selected from the group consisting of: {each said container entering said at least one border crossing or at said at least one customs entry point; said customs at said at least one destination country; a network of shippers; a network of consignees; a network of forwarders; a plurality of terminals; and a network of carriers}.

5. The method of claim 4, wherein said step (E2) of using said secure ERP web-site based system to expedite said release procedure at said at least one border crossing or at said at least one customs entry point of each said ERP cargo container further comprises the steps of:

(E2, 1) utilizing said set of data selected from the group consisting of: {said RFID data; said set of satellite navigational tracking data; and said set of threat signal data} to indicate a physical location of at least one said ISS cargo container that will be submitted for customs clearance within a predetermined distance and time of arrival from a port of discharge and/or port of entry, wherein each said ISS cargo container has generated at least one said previously undetected SST (PUSST) signal;

and wherein the current location of each said ISS cargo container is posted on said secure ERP website; and wherein a predetermined number of said ISS cargo containers in said cargo shipment should be physically inspected at said at least one border crossing or at said at least one customs entry point or at port of customs entry;

and (E2, 2) using said secure ERP website-based system configured to enable the preparation and population of a set of ERP data documentation for said expedite release procedure for each ERP cargo container including a set of data selected from the group consisting of: {a set of commercial invoices; a set of packing lists; a set of manifests; a set of Bills of Lading; a set of commercial documents including a certificate of origin, manufacturer safety data sheets, pre-shipment cargo inspection reports, documentary collections, quota certificates, solid wood packing declarations; and a set of customs entry data}; wherein each said ERP cargo container is immediately released into the stream of commerce without being physically inspected at said border crossing or at said at least one customs entry point.

6. The method of claim 5, wherein said step (E2, 2) of using said secure ERP website-based system configured to enable the preparation and population of said set of ERP data documentation for said expedite release procedure for each ERP cargo container further comprises the steps of:

(E2, 2, 1) securing a set of ERP-enabling data collected on a website/portal of said secure ERP website-based system; wherein said ERP-enabling data is selected from the group consisting of: {a consignee data including a customs broker data; a shipper data; a carrier data including a port/terminal data from said port of departure; and a customs/Automated Brokerage Interface (ABI)/Other Governmental Agency (OGA) data}; wherein said ERP-enabling data comes from each said appropriate party located anywhere in the world;

(E2, 2, 2) disseminating said set of ERP-enabling data to each said appropriate party; wherein said appropriate party is selected from the group consisting of: {said consignee; a customs broker; said shipper; said carrier; said port and terminal operator; said customs; a designated agent of said consignee; a designated agent of said customs broker; a designated agent of said shipper; a designated agent of said carrier; a designated agent of said port and terminal operator; and a designated agent of said customs};

and (E2, 2, 3) establishing a shipper verification system that provides a positive assurance that said new cargo shipment is secure throughout the entire supply chain.

7. The method of claim 6, wherein said step (E2, 2, 3) of establishing said shipper verification system further comprises the steps of:

(E2, 2, 3, 1) establishing a global network of authorized unprejudiced agents that could complete an initial verification on each particular shipper to make sure that said shipper has established a safety procedure that conforms to the USA government, or to a set of international standards yet to be determined;

(E2, 2, 3, 2) nominating an employee of the company to be named a security officer, or an 'empowered person' that is responsible for supervising loading of each new cargo shipment and declaring each cargo container safe before it is sealed; wherein said security officer confirms that the documentation is correct and no smuggling is intended; and wherein said security officer confirms that each said cargo container is sealed;

(E2, 2, 3, 3) entering the verification data linked to a unique shipper ID code into a verification database by said authorized unprejudiced agent; wherein said unique shipper ID code is similar to or is directly tied to the customs concept of a Manufacturer ID code; and wherein said shipper is enrolled into a database of "known" shippers once said shipper ID code has been entered into said verification database; and wherein said verification database and said known "shippers" database are accessible via said secure ERP website-based system by a user having a proper registered username and a proper registered password;

and (E2, 2, 3, 4) declaring said cargo safe from said SST signals to Homeland Security, conforming said cargo with said set of issued commercial documentation, and initiating the physical movement of said cargo after the shipper is verified.

8. The method of claim 5, wherein said step (E2, 2) of using said secure ERP website-based system configured to enable the preparation and population of said set of ERP data documentation for customs entry transmission for each said ERP cargo container further comprises the steps of:

(E2, 2, 4) obtaining an account by a party who is responsible for payment and coordination of said cargo shipment with a website/portal provider of said secure ERP website-based system and or/obtaining an account by said party who is responsible for payment and coordination of said cargo shipment directly with customs at said country of destination, wherein said party who is responsible for payment and coordination of said cargo shipment is selected from the group consisting of: {a consignee; a shipper; or a third party that is responsible for the payment and coordination of the cargo shipment};

(E2, 2, 5) logging in into one said account by said party who is responsible for payment and coordination of said cargo shipment to generate a new cargo shipment that is identified by a unique cargo shipment number;

(E2, 2, 6) generating a purchase order by said party who is responsible for payment and coordination of said cargo shipment;

(E2, 2, 7) generating a commercial invoice by said shipper;

(E2, 2, 8) generating a manifest transmission & Bill of Lading (B/L) info by said carrier and/or a freight forwarder;

(E2, 2, 9) performing review of Entry Data by said customs broker and/or an importer of record and said party who is responsible for payment and coordination of said cargo shipment to correct any possible errors or to make clarifications before transmission;

(E2, 2, 10) generating a signal to trigger transmission of customs entry by said website/portal when a cargo container is within a predetermined length of time away from arrival at a physical border;

(E2, 2, 11) disseminating said customs release data to appropriate parties by customs via said website/portal;

(E2, 2, 12) disseminating said cargo release data by said carrier and or said freight forwarders to each said appropriate parties via said website/portal;
and (E2, 2, 13) reverting to the standard methods of submission of customs entry and documents (via traditional ABI transmission or by submitting hard copies of actual documents) to customs in the event that any said data is missing or rejected or if customs or other governmental agency is to more closely review the shipping and commercial documents; wherein said standard methods of submission of customs entry and documents include using a standard customs rejection procedure and filing of a correction procedure if any said data is missing or rejected.

9. The method of claim 8, wherein said step (E2, 2, 5) further comprises the following step:

(E2, 2, 5, 1) linking an account of said party who is responsible for payment and coordination of said cargo shipment to a set of data selected from the group consisting of: {a predetermined PIN # and/or password; a Federal Tax ID# of said party who is responsible for payment and coordination of said cargo shipment; a Bond type; a surety code; a primary delivery warehouse; a set of delivery locations; a list or database of the Harmonized Tariff numbers for all imported goods for said party who is responsible for payment and coordination of said cargo shipment; and a set of relevant customs binding rulings}.

10. The method of claim 8, wherein said step (E2, 2, 6) further comprises the following steps:

(E2, 2, 6, 1) using said PIN# to generate said purchase order based on a set of data selected from the group consisting of: {a supplier contact info; a consignee contact info; a number of pieces being purchased; a purchase price per item; a currency of transaction; customs harmonized Codes for each item being purchased and/or shipped; Commercial Bill of Lading (B/L) Description of goods; Purchaser=s sku #s of the goods; date of purchase order; INCO Terms; a desired mode of transport; a desired carrier; related parties (yes/no); an Importer=s account number including Federal Tax ID#; binding ruling number; an ach payment type; OGA filing codes; and final delivery address and contact info};

(E2, 2, 6, 2) using said PIN# to control access to said new cargo shipment and to grant access to said new cargo shipment to a set of appropriate parties selected from the group consisting of: {at least one shipper; at least one custom broker; at least one forwarder; and at least one carrier};

(E2, 2, 6, 3) using said PIN# to update a set of account data selected from the group consisting of: {an update to delivery address; an update to customs entry; an update in value; and other relevant updates that may occur while the cargo shipment is enroute};
and (E2, 2, 6, 4) establishing an audit trail with each update of said account data to specifically identify a party which is responsible for the relevant updates, or to specifically identify a party which authorized the relevant updates.

11. The method of claim 8, wherein said step (E2, 2, 7) further comprises the following step:

(E2, 2, 7, 1) confirming a set of data selected from the group consisting of: {a supplier contact info; a consignee contact info; a number of pieces being shipped; a sales price per item and a total price; a currency of transaction; a commercial Bill of Lading (B/L) description of goods; seller=s sku #s of the goods; a date of invoice; INCO Terms; a mode of transport; a type of packaging units of measure; a SWP declaration; a net weight/gross weight/volume; a number of containers; a type of equipment; a seal number; a vessel; a voyage #; a SCAT code; BL#s; and a country of origin per item}.

12. The method of claim 8, wherein said step (E2, 2, 8) further comprises the following steps:

(E2, 2, 8, 1) sending a manifest to Customs and Border Protection (CBP) and initiating data for Bills of Lading and Arrival Notice by specifying a set of data selected from the group consisting of: {a port of Lading: a port of Unlading;

a place of delivery; IT #s and dates; and bonded carrier details};
and (E2, 2, 8, 2) confirming arrival of said cargo shipment at loading pier by using a Smart Container lock/Strongbox device.

13. The method of claim 8, wherein said step (E2, 2, 10) further comprises the following steps:

(E2, 2, 10, 1) confirming that said cargo shipment of containers is nearing a physical border crossing or is nearing customs entry point by using said navigational and said container ID technology;

(E2, 2, 10, 2) checking a plurality of alarm events associated with said container cargo shipment;

and (E2, 2, 10, 3) compiling a set of customs entry relevant data selected from the group consisting of: {a customs location code at port of entry; a central exam site; values and weight calculations per Customs requirements; freight charges; statistical quantities; manufactures ID Code; units of measure; Duty; MPF; HMF; CVD; a Bond #; and an ACH Payment type}.

14. The method of claim 13, wherein said step (E2, 2, 10, 2) of checking said plurality of alarm events associated with said container cargo shipment further comprises the following step:

increasing the frequency of periodically checking alarm events associated with said SST signals when said cargo ship approaches an arrival port.

15. The method of claim 13, wherein said step (E2, 2, 10, 2) of checking said plurality of alarm events associated with said container cargo shipment further comprises the following step:

programming the frequency of periodically checking alarm events associated with said SST signals to take into account nearing approach to a harbor.

16. The method of claim 13, wherein said step (E2, 2, 10, 2) of checking said plurality of alarm events associated with said container cargo shipment further comprises the following step:

unloading of additional testing to be performed as the ship is within the 12 mile international water boundary limit of any country, whether a destination country or not.

17. The method of claim 8, wherein said step (E2, 2, 11) further comprises the following steps:

(E2, 2, 11, 1) checking whether customs has indicated that said cargo shipment is cleared and able to be released into commerce;

(E2, 2, 11, 2) checking Customs 7501 form; wherein said Customs 7501 form known as the >Entry Summary=details a set of substantially significant data that is required to be submitted to customs prior to release;

(E2, 2, 11, 3) checking Customs 3461 form; wherein said Customs 3461 form is signed by customs or a responsible broker upon release of goods from customs; and (E2, 2, 11, 4) initiating any other liquidation data or administrative messages.

18. The method of claim 8, wherein said step (E2, 2, 12) further comprises the following step:

(E2, 2, 12, 1) disseminating said cargo released data in a method similar to the current Automated Manifest System (AMS).

\* \* \* \* \*